US012785982B1

(12) United States Patent
Krellenstein et al.

(10) Patent No.: US 12,785,982 B1
(45) Date of Patent: Nov. 3, 2026

(54) SYSTEMS AND METHODS FOR PREVENTING DATA LEAKAGE IN COMPUTER NETWORKS

(71) Applicant: Platonic Holdings, Inc., New York, NY (US)

(72) Inventors: Adam Krellenstein, New York, NY (US); Yiqun Yin, Riverside, CT (US); Rune Tevasvold Aune, Trondheim (EE)

(73) Assignee: Platonic Holdings, Inc., New York, NY (US)

( * ) Notice: Subject to any disclaimer, the term of this patent is extended or adjusted under 35 U.S.C. 154(b) by 0 days.

(21) Appl. No.: 19/214,554

(22) Filed: May 21, 2025

Related U.S. Application Data

(63) Continuation of application No. 16/029,238, filed on Jul. 6, 2018, now abandoned.

(Continued)

(51) Int. Cl.
*H04L 9/06* (2006.01)
*H04L 9/08* (2006.01)
(Continued)

(52) U.S. Cl.
CPC .......... *H04L 9/3236* (2013.01); *H04L 9/0825* (2013.01); *H04L 9/30* (2013.01); *H04L 9/3247* (2013.01)

(58) Field of Classification Search
CPC ....... H04L 9/30; H04L 9/3236; H04L 9/0825; H04L 9/3247
See application file for complete search history.

(56) References Cited

U.S. PATENT DOCUMENTS 5,550,976 A 8/1996 Henderson et al.
9,397,985 B1 7/2016 Seger, II et al.
(Continued)

FOREIGN PATENT DOCUMENTS

EP 2852121 A2 3/2015
KR 20180060044 A 6/2018
(Continued)

OTHER PUBLICATIONS

[Author Unknown] "Counterparty introduces truly trustless games on the blockchain." Jul. 2014 [retrieved online] <URL: http://counterparty.io/news/introducing-fully-trustless-games-on-block> 3 pages.

(Continued)

*Primary Examiner* — Noura Zoubair
(74) *Attorney, Agent, or Firm* — COOLEY LLP

(57) ABSTRACT

A method includes applying a hash function to a concatenation of first unencrypted plaintext data and a salt value to produce a hash value. The hash value is signed based on a private encryption key from a first public/private encryption key pair, to produce a first signed message that is sent to a plurality of compute devices that implement a distributed network. The method further includes receiving a second signed message that includes a concatenation of the first signed message and a third signed message sent from at least one compute device from the plurality of compute devices, the second signed message being signed based on a private encryption key from a second public/private encryption key pair associated with the distributed network, and the third signed message being generated via the at least one compute device based on second unencrypted plaintext data received at the at least one compute device.

20 Claims, 13 Drawing Sheets

Related U.S. Application Data

(60) Provisional application No. 62/625,117, filed on Feb. 1, 2018, provisional application No. 62/529,954, filed on Jul. 7, 2017.

(51) Int. Cl.
*H04L 9/30* (2006.01)
*H04L 9/32* (2006.01)

(56) References Cited

U.S. PATENT DOCUMENTS

| | | | | |
|---|---|---|---|---|
| 9,569,771 | B2 | 2/2017 | Lesavich et al. | |
| 9,722,790 | B2 | 8/2017 | Ebrahimi | |
| 10,135,607 | B1 | 11/2018 | Roets | |
| 10,146,792 | B1 | 12/2018 | Dobrek et al. | |
| 10,320,843 | B1 | 6/2019 | Dobrek et al. | |
| 10,476,847 | B1 | 11/2019 | Smith et al. | |
| 2005/0038732 | A1 | 2/2005 | Sweeting et al. | |
| 2005/0204128 | A1 | 9/2005 | Aday et al. | |
| 2006/0265259 | A1 | 11/2006 | Diana et al. | |
| 2007/0129958 | A1 | 6/2007 | Wu et al. | |
| 2009/0182667 | A1 | 7/2009 | Parkes et al. | |
| 2014/0156534 | A1 | 6/2014 | Quigley et al. | |
| 2015/0262176 | A1 | 9/2015 | Langschaedel et al. | |
| 2016/0210710 | A1 | 7/2016 | Glennon | |
| 2016/0342994 | A1 | 11/2016 | Davis | |
| 2016/0379013 | A1 | 12/2016 | Ganesan et al. | |
| 2017/0005804 | A1 | 1/2017 | Zinder | |
| 2017/0017954 | A1 | 1/2017 | McDonough et al. | |
| 2017/0046689 | A1 | 2/2017 | Lohe et al. | |
| 2017/0046698 | A1 | 2/2017 | Haldenby et al. | |
| 2017/0075941 | A1 | 3/2017 | Finlow-Bates | |
| 2017/0085555 | A1 | 3/2017 | Bisikalo et al. | |
| 2017/0104731 | A1 | 4/2017 | Baudoin et al. | |
| 2017/0116693 | A1 | 4/2017 | Rae et al. | |
| 2017/0124556 | A1 | 5/2017 | Seger, II | |
| 2017/0155515 | A1 | 6/2017 | Androulaki et al. | |
| 2017/0161829 | A1 | 6/2017 | Mazier | |
| 2017/0177898 | A1 | 6/2017 | Dillenberger | |
| 2017/0213221 | A1 | 7/2017 | Kurian et al. | |
| 2017/0230189 | A1 | 8/2017 | Toll et al. | |
| 2017/0236104 | A1 | 8/2017 | Biton | |
| 2017/0243193 | A1 | 8/2017 | Manian et al. | |
| 2017/0243209 | A1 | 8/2017 | Johnsrud et al. | |
| 2017/0279774 | A1 | 9/2017 | Booz et al. | |
| 2017/0289111 | A1 | 10/2017 | Voell et al. | |
| 2017/0300627 | A1 | 10/2017 | Giordano et al. | |
| 2017/0330159 | A1 | 11/2017 | Castinado et al. | |
| 2017/0352012 | A1 | 12/2017 | Hearn et al. | |
| 2017/0352116 | A1* | 12/2017 | Pierce | H04L 67/53 |
| 2018/0018738 | A1 | 1/2018 | Bernauer et al. | |
| 2018/0075686 | A1 | 3/2018 | Campero et al. | |
| 2018/0089641 | A1 | 3/2018 | Chan et al. | |
| 2018/0089761 | A1 | 3/2018 | Stradling et al. | |
| 2018/0101848 | A1 | 4/2018 | Castagna et al. | |
| 2018/0117447 | A1 | 5/2018 | Tran et al. | |
| 2018/0183768 | A1 | 6/2018 | Lobban et al. | |
| 2018/0253702 | A1 | 9/2018 | Dowding | |
| 2018/0254898 | A1 | 9/2018 | Sprague et al. | |
| 2018/0262493 | A1 | 9/2018 | Andrade | |
| 2018/0268386 | A1 | 9/2018 | Wack et al. | |
| 2018/0294966 | A1 | 10/2018 | Hyun et al. | |
| 2018/0375847 | A1 | 12/2018 | Schropfer | |
| 2019/0012662 | A1* | 1/2019 | Krellenstein | G06Q 20/3827 |
| 2019/0013943 | A1 | 1/2019 | Maim | |
| 2019/0013948 | A1 | 1/2019 | Mercuri et al. | |
| 2019/0052458 | A1 | 2/2019 | Wright et al. | |
| 2019/0073666 | A1 | 3/2019 | Ortiz et al. | |
| 2019/0114706 | A1 | 4/2019 | Bell et al. | |
| 2019/0147532 | A1 | 5/2019 | Singh et al. | |
| 2019/0166095 | A1 | 5/2019 | Tobin | |
| 2019/0191293 | A1 | 6/2019 | Nelson et al. | |
| 2019/0305935 | A1 | 10/2019 | Qiu | |
| 2019/0373137 | A1 | 12/2019 | Krukar et al. | |
| 2020/0112545 | A1 | 4/2020 | Smith et al. | |
| 2021/0377225 | A1* | 12/2021 | Smith | H04L 63/04 |

FOREIGN PATENT DOCUMENTS

| | | | |
|---|---|---|---|
| WO | WO-2018209222 | A1 | 11/2018 |
| WO | WO-2019010392 | A1 | 1/2019 |

OTHER PUBLICATIONS

[Author Unknown] "Distributed Ledger Technology: Implications of Blockchain for the Securities Industry. Report on Distributed Ledger Technology." FINRA, Jan. 2017. [retrieved online] <URL: http://www.finra.org/sites/defualt/files/FINRA BlockchainReport.pdf>, 22 pages.

[Author Unknown] Ethereum Homestead Documentation, Release 0.1. Ethereum Community. Mar. 1, 2017. [retrieved online]. <URL: https://media.readthedocs.org/pdf/ethereum-homestead/latest/ethereum-homestead.pdf>, 127 pages.

[Author Unknown] "SHA-3 Standard: Permutation-Based Hash and Extendable Output Functions." U.S. Dept. of Commerce and National Institute of Standards and Technology's Aug. 2015; 37 pages.

[Author Unknown] "Solidity Documentation, Release 0.4.4-decelop." [website] Feb. 13, 2017. [retrieved online] <URL: https://solidity.readthedocs.io/en/vO.4.4/introduction-to-smart-contracts.html>, 121 pages.

Bessani et al. "State Machine Replication for the Masses with BFT-SMART." In 2014 44th Annual IEEE/IFIP International Conference on Dependable Systems and Networks. Jun. 23, 2014; 8 pages.

Cecchetti et al. "Solidus: Confidential distributed ledger transactions via PVORM." In Proceedings of the 2017 ACM SIGSAC Conference on Computer and Communications Security Oct. 30, 2017, Dallas, TX (pp. 701-717).

Christidis et al. "Blockchains and smart contracts for the internet of things." IEEE Access. May 10, 2016;4:2292-2303.

Demarinis et al. "Is Blockchain the Answer to E-voting? Nasdaq Believes So. An Update on Nasdaq's Estonia E-voting Blockchain Solution." Nasdaq, Market Insite. Jan. 23, 2017. [retrieved online] <URL: https://www.nasdaq.com/articles/blockchain-answer-e-voting-nasdaq-believes-so-2017-01-23>, 5 pages.

Demirbas et al. "Beyond True Time: Using Augmented Time for Improving Spanner." In 7th Workshop Large-Scale Distributed System Middleware Aug. 2013 (pp. 1-5).

Dodis Y. "Introduction of Cryptography—Lecture 14." Apr. 25, 2012; 14 pages.

Egelund-Muller et al. "Automated execution of financial contracts on blockchains." Business & Information Systems Engineering. Nov. 2017;59:457-467.

Eha B.P. "Who owns what, really? In securities, Delaware may soon clear things up." Jul. 5, 2017 [retrieved online]. <URL: https://www.americanbanker.com/news/who-owns-what-really-in-securities-Delaware-may-soon-clear-things-up>, 8 pages.

Harvey CR. "Cryptofinance." SSRN. Jan. 2016: 141 pages. [retrieved online]. <URL: https://papers.ssrn.com/sol3/papers.cfm?abstract_id=2438299>, 141 pages.

Irrera A. "Northern Trust users blockchain for private equity record-keeping." Reuters, Funds News. Feb. 22, 2017. [retrieved online] <URL: https://www.reuters.com/article/nthern-trust-ibm-blockchain-idUSL1N1G61TX>, 6 pages.

Irrera et al. "London Stock Exchange Group tests blockchain for private company shares." Reuters, Jul. 19, 2017. [retrieved online]. <URL: https://www.reuters.com/article/us-lse-blockchain/london-stock-exchange-group-tests-blockchain-for-private-company-shares-idUSKBN1A40ME>, 2 pages.

Kharpal A. "Nasdaq to trial blockchain voting for shareholders." CNBC.com. Feb. 12, 2016. [retrieved online] <URL: https://www.cnbc.com/2016/02/12/nasdaq-to-trial-blockchain-voting-for-shareholders.html>, 5 pages.

(56) References Cited

OTHER PUBLICATIONS

Klems et al. "Trustless intermediation in blockchain-based decentralized service marketplaces." In Service-Oriented Computing, ICSOC 2017. Lecture Notes in Computer Science. Oct. 18, 2017;10601:731-739.

Lamport L. "Time, clocks, and the ordering of events in a distributed system." Communications of the ACM. Jul. 1978.; 21(7):558-565.

Metz C. "SEC Approves Plan to Issue Stock via Bitcoin's Blockchain." Wired.com. Dec. 15, 2015. [retrieved online] <URL: https://www.wired.com/2015/12/sec-approves-plan-to-issue-company-stock-via-the-bitcoin-blockchain>, 10 pages.

Nakamoto S. "Bitcoin: A Peer-to-Peer Electronic Cash System." White Paper.Jan. 1, 2008;4(2):15I, 9 pages.

Neisse et al. "A blockchain-based approach for data accountability and provenance tracking." In Proceedings of the 12th International Conference on Availability, Reliability and Security (ARES). Aug. 29, 2017 (pp. 1-10).

Noether et al. "Ring Confidential Transactions." Monero Research Lab. Feb. 2016; 1-20.

Pinna et al. "Distributed ledger technologies in securities post-trading revolution or evolution?." European Central Bank. Apr. 26, 2016;172: 35 pages.

Rizzo P. "Hands On With Linq, Nasdaqs Private Markets Blockchain Project." [website] Nov. 21, 2015 [retrieved online] <URL: https://www.coindesk.com/hands-on-with-linq-nasdaqs-private-markets-blockchain-project>, 12 pages.

Say M. "Why The Delaware Blockchain Initiative Matters To All Dealmakers." Forbes [blog]. Sep. 20, 2017. [retrieved online]. < URL: https://www.forbes.com/sites/groupthink/2017/09/20/why-the-delaware-blockchain-initiative-matters-to-all-dealmakers/#724fa5b67550>, 5 pages.

Shepperd Mullin "Taking Stock in Blockchains." Venture Law Blog [blog]. Jun. 9, 2017. [retrieved online]. <URL: https://www.venturelawblog.com/other/blockchain>, 4 pages.

Tinianow et al. "Delaware blockchain initiative: Transforming the foundational infrastructure of corporate finance." Harv. L. Sch. F. on Corp. Governance & Fin. Reg. 2017, 5 pages.

Tinianow et al. "Delaware's 2017 Resolution: Make Blockchain a Reality." Coindesk.com. Jan. 3, 2017. [retrieved online]. <URL: https://www.coindesk.com/what-expect-delaware-blockchain-initiative-2017>, 5 pages.

Tonelli et al. "Implementing a Microservices System with Blockchain Smart Contracts." 2019 IEEE International Workshop on Blockchain Oriented Software Engineering (IWBOSE), Hangzhou, China, Feb. 24, 2019 (pp. 22-31).

Udris J. "Using Blockchain Technology for Limited Company Shares Management." Medium, Miner One [blog]. Jan. 18, 2018. [retrieved online] <URL: https://medium.com/@minerone.io/using-blockchain-technology-for-limited-company-shares-management-cd8c344c2954>, 4 pages.

Walport M. (ed.) "Distributed ledger technology: beyond block chain. A report by the UK Government Chief Scientific Adviser." UK Government Office for Science; 2016; 88 pages.

Yermack, D. "Corporate Governance and Blockchains." National Bureau of Economic Research. Dec. 2015. [retrieved online]. <URL: https://www.nber.org/papers/w21802>, 41 pages.

Zhang et al. "Metrics for assessing blockchain-based healthcare decentralized apps." IEEE 19th International Conference on E-Health Networking, Applications and Services (Healthcom) Oct. 12, 2017 (pp. 1-4).

U.S. Appl. No. 16/029,238 , Non-Final Office Action mailed Dec. 27, 2021, Inventor Krellenstein, Adam et al.; 30 pages.

U.S. Appl. No. 16/029,238, Final Office Action mailed Jan. 21, 2021, Inventor Krellenstein, Adam et al.; 38 pages.

U.S. Appl. No. 16/029,238, Final Office Action mailed May 17, 2019, Inventor Krellenstein, Adam et al.; 37 pages.

U.S. Appl. No. 16/029,238, Final Office Action mailed Oct. 11, 2022, Applicant Inventor Krellenstein, Adam et al.; 30 pages.

U.S. Appl. No. 16/029,238, Non-Final Office Action mailed Apr. 17, 2020, Inventor Krellenstein, Adam et al.; 37 pages.

U.S. Appl. No. 16/029,238, Non-Final Office Action mailed Oct. 16, 2018; Inventor Krellenstein, Adam et al.; 28 pages.

PCT Application No. PCT/US2018/041052, International Preliminary Report on Patentability mailed Jan. 16, 2020; Applicant Symbiont.Io, Inc.; 8 pages.

PCT Application No. PCT/US2018/041052, International Search Report and Written Opinion mailed Nov. 16, 2018; Applicant Symbiont.Io, Inc.; 9 pages.

PCT Application No. PCT/US2020/027798, International Search Report and Written Opinion mailed Jul. 24, 2020; Applicant Symbiont.Io, Inc., et al.; 8 pages.

* cited by examiner

| | Publication Board | Information Posted |
|---|---|---|
| 106 | Commitment Board | List of Commitments |
| 110 | Priority Board | List of Commitment-Priority Pairs |
| 114 | Trade Order Board | List of Commitment-Priority-Trade Order Plaintext Triples |
| 118 | Trade Board | List of Trades |

FIG. 2

SYSTEMS AND METHODS FOR PREVENTING DATA LEAKAGE IN COMPUTER NETWORKS

This application is a continuation of U.S. patent application Ser. No. 16/029,238, filed Jul. 6, 2018, titled "SYSTEMS, METHODS, AND DEVICES FOR REDUCING AND/OR ELIMINATING DATA LEAKAGE IN ELECTRONIC LEDGER TECHNOLOGIES FOR TRUSTLESS ORDER MATCHING," which claims the benefit of U.S. Provisional Patent Application No. 62/529,954, filed Jul. 7, 2017, titled "METHODS AND SYSTEMS FOR REDUCING OR ELIMINATING INFORMATION LEAKAGE AND PROVIDING SECURE DATA EXCHANGE VIA DISTRIBUTED LEDGERS," and U.S. Provisional Patent Application No. 62/625,117, filed Feb. 1, 2018, titled "METHODS AND SYSTEMS FOR SECURE, AUDITABLE ORDER MATCHING AND RESOLUTION," the entire contents of each of which are hereby expressly incorporated by reference for all purposes.

BACKGROUND

Field

The present application generally relates to computer networks.

In some embodiments, there is disclosed systems, devices, and methods for using cryptographic hash values in conjunction with computer networks.

Description

Generally speaking, ledgers, such as electronic ledgers, can be distributed or not. Among electronic ledger technologies, distributed ledger technology (DLT) can refer to a consensus of shared and synchronized data that can be spread across multiple sites and/or systems without any centralized data storage. DLT can be centralized or decentralized and can be used to, for example, handle a myriad of transaction types, such as handle stock trades, clear and settle leveraged loans, handle catastrophe reinsurance, track land titles and transactions, record ownership of intellectual property, facilitate peer-to-peer marketplaces, and/or the like.

SUMMARY

Various embodiments described herein relate to systems, methods, and devices for reducing and/or eliminating information leakage and providing secure data exchange. In some embodiments, a cryptographic hash commitment-based system for matching trade orders comprises: a cryptographic platform configured to access plaintext data, the plaintext data is inputted by a user into a dynamically generated user interface, wherein the plaintext data comprises trade order data for performing a trade order; the cryptographic platform further configured to generate a cryptographic hash commitment based on the plaintext data received from user input and based on an extended field, the cryptographic hash commitment corresponding to and without including the plaintext data comprising transaction information, wherein non-permitted third parties cannot determine the plaintext data from the cryptographic hash commitment; the cryptographic platform configured to transmit the cryptographic hash commitment to an electronic order matching platform, wherein the electronic order matching platform is configured to irrevocably publish the cryptographic hash commitment on a commitment board, wherein upon irrevocably publishing the cryptographic hash commitment on the commitment board, a time priority is assigned to the cryptographic hash commitment, wherein the electronic order matching platform is configured to store on a priority board the cryptographic hash commitment and the time priority in order to irrevocably publish the time priority of the cryptographic hash commitment; the cryptographic platform configured to access a confirmation of the assignment of the time priority to the cryptographic hash commitment; and the cryptographic platform configured to transmit the plaintext data to the electronic order matching platform, wherein the electronic order matching platform is configured to irrevocably publish the plaintext data and the cryptographic hash commitment on a trade order board, wherein correlation between the plaintext data and the cryptographic hash commitment can be confirmed by re-generating the cryptographic hash commitment based on the plaintext data and the extended field, wherein upon completion of matching the trade order with one or more other trade orders, trade data is generated based on the completion of the matching and is transmitted through an electronic ledger interface to an electronic distributed ledger technology, the transmission of the trade data triggered based at least in part on completion of matching the trade order with the second trade orders using the plaintext data, the cryptographic hash commitment, and the time priority, wherein the electronic ledger interface is configured to access the electronic distributed ledger technology that is digitally stored in a distributed network that comprises a plurality of physically distributed computer systems configured to maintain the electronic distributed ledger technology, and wherein the electronic distributed ledger technology is configured to track at least one asset ownership transaction using the cryptographic platform for matching trade orders.

In some embodiments, the cryptographic platform is configured to transmit the extended field with the plaintext data to the electronic order matching platform. In some embodiments, the cryptographic platform and the electronic order matching platform are operating a single computer system. In some embodiments, the cryptographic platform operates on first computer system, and the electronic order matching platform operates on a second computer system. In some embodiments, the cryptographic platform and the electronic order matching platform are operating across a distributed computer system. In some embodiments, the electronic order matching platform is configured to receive user input from the user authorizing the transmission of the plaintext data from the cryptographic platform to the electronic order matching platform. In some embodiments, the electronic order matching platform is configured to assess a penalty on the user based on failure to receive authorization from the user to transmit the plaintext data from the cryptographic platform to the order matching platform within a predetermined period of time. In some embodiments, the electronic distributed ledger technology is a blockchain. In some embodiments, the cryptographic hash commitment is assigned the time priority by a mining node. In some embodiments, the completion of the trade order matching is performed by a central processing entity system. In some embodiments, the completion of the trade order matching is performed by a plurality of users utilizing the cryptographic hash commitment-based system. In some embodiments, the cryptographic hash commitment is configured to be signed digitally by the user.

In some embodiments, a cryptographic commitment-based system for matching trade orders comprises: a cryptographic platform configured to access plaintext data, the plaintext data is inputted by a user into a dynamically generated user interface, wherein the plaintext data comprises trade order data for performing a trade order; the cryptographic platform further configured to generate a cryptographic commitment based on the plaintext data received from user input and based on an extended field, the cryptographic commitment corresponding to and without including the plaintext data comprising transaction information, wherein non-permitted third parties cannot determine the plaintext data from the cryptographic commitment; the cryptographic platform configured to transmit the cryptographic commitment to an electronic order matching platform, wherein the electronic order matching platform is configured to irrevocably publish the cryptographic commitment on a commitment board, wherein upon irrevocably publishing the cryptographic commitment on the commitment board, a time priority is assigned to the cryptographic commitment, wherein the electronic order matching platform is configured to store on a priority board the cryptographic commitment and the time priority in order to irrevocably publish the time priority of the cryptographic commitment; the cryptographic platform configured to access a confirmation of the assignment of the time priority to the cryptographic commitment; and the cryptographic platform configured to transmit the plaintext data to the electronic order matching platform, wherein the electronic order matching platform is configured to irrevocably publish the plaintext data and the cryptographic commitment on a trade order board, wherein correlation between the plaintext data and the cryptographic commitment can be confirmed by re-generating the cryptographic commitment based on the plaintext data and the extended field, wherein upon completion of matching the trade order with one or more other trade orders, trade data is generated based on the completion of the matching and is transmitted through an electronic ledger interface to an electronic distributed ledger technology, the transmission of the trade data triggered based at least in part on completion of matching the trade order with the one or more other trade orders using the plaintext data, the cryptographic commitment, and the time priority, wherein the electronic ledger interface is configured to access the electronic distributed ledger technology that is digitally stored in a distributed network that comprises a plurality of physically distributed computer systems configured to maintain the electronic distributed ledger technology, and wherein the electronic distributed ledger technology is configured to track at least one asset ownership transaction using the cryptographic platform for matching trade orders.

In some embodiments, the cryptographic platform is configured to transmit the extended field with the plaintext data to the electronic order matching platform. In some embodiments, the cryptographic platform and the electronic order matching platform are operating a single computer system. In some embodiments, the cryptographic platform operates on first computer system, and the electronic order matching platform operates on a second computer system. In some embodiments, the cryptographic platform and the electronic order matching platform are operating across a distributed computer system. In some embodiments, the electronic order matching platform is configured to receive user input from the user authorizing the transmission of the plaintext data from the cryptographic platform to the electronic order matching platform. In some embodiments, the electronic order matching platform is configured to assess a penalty on the user based on failure to receive authorization from the user to transmit the plaintext data from the cryptographic platform to the order platform within a predetermined period of time. In some embodiments, the cryptographic commitment is generated based on a hash function. In some embodiments, the cryptographic commitment is configured to be signed digitally by the user. In some embodiments, the electronic distributed ledger technology is a blockchain. In some embodiments, the cryptographic commitment is assigned the time priority by a mining node. In some embodiments, the completion of the trade order matching is performed by a central processing entity system. In some embodiments, the completion of the trade order matching is performed by a plurality of users utilizing the cryptographic commitment-based system.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

A better understanding of the devices and methods described herein will be appreciated upon reference to the following description in conjunction with the accompanying drawings, wherein:

FIG. 2 is a chart illustrating example embodiment(s) of publication boards and information that can be posted on the same;

DETAILED DESCRIPTION

Figure 1:
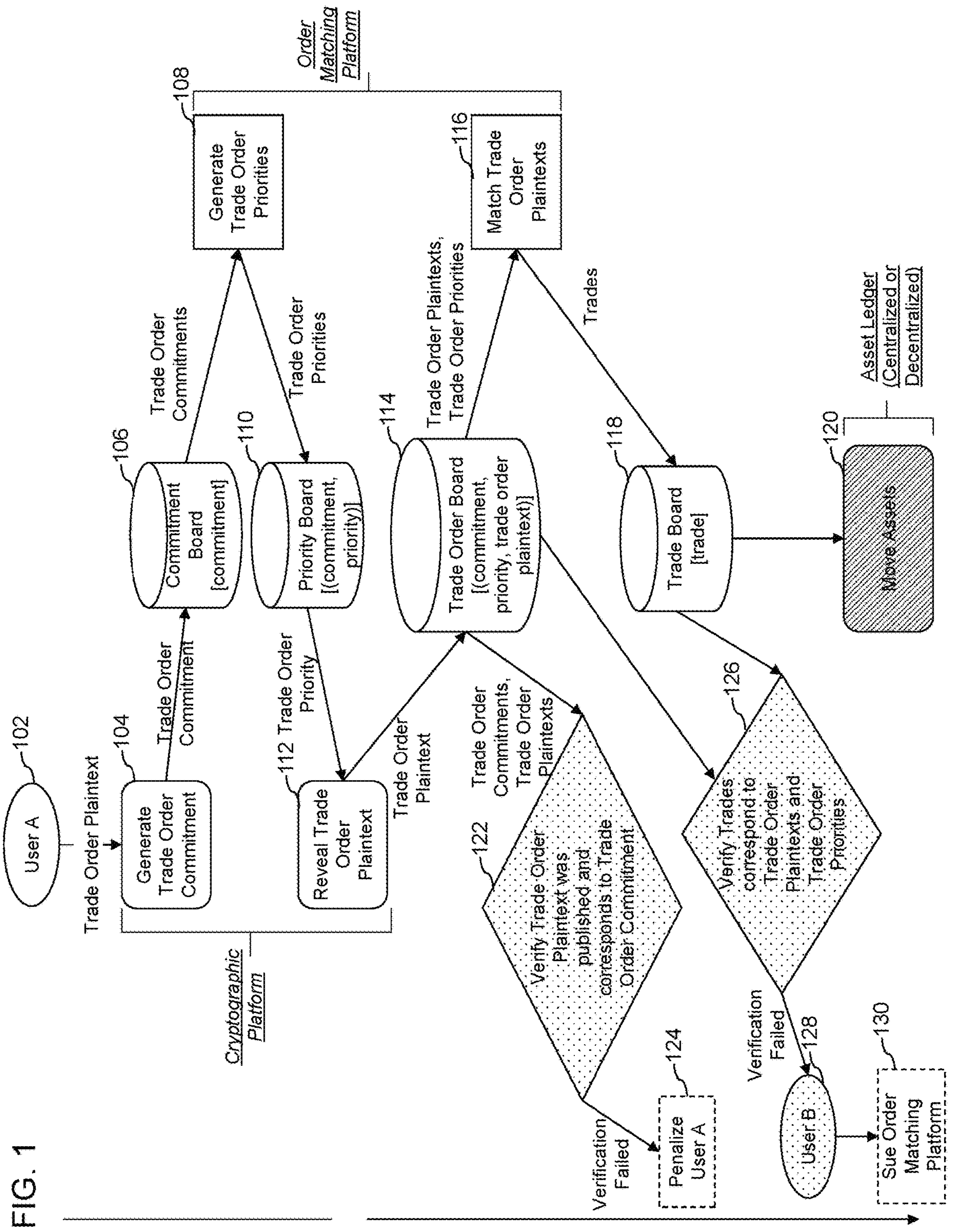
FIG. 1 is a flowchart illustrating an overview of an example embodiment(s) of trustless centralized order matching.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of some specific embodiments of the inventions. In addition, embodiments of the inventions can comprise several novel features and no single feature is solely responsible for its desirable attributes or is essential to practicing the inventions herein described.

With the development of technology, various ledger technologies, whether distributed or not, have become widely available and/or are being developed for a number of applications. Some examples of non-distributed ledgers can include traditional exchanges and dark pools, among others. Further, various distributed ledger technology (DLT) based platforms or blockchain-based platforms have and are being developed for a number of uses. For example, DLT-based platforms have and/or are being developed for cryptocurrencies, such as Bitcoin, as well as applications to financial back-office infrastructure, handle stock trades, clear and settle leveraged loans and/or a myriad of transaction types. In addition, other DLT-based applications can include handling catastrophe reinsurance, tracking land titles and transactions, recording ownership of intellectual property, facilitating peer-to-peer marketplaces, and/or the like, to name a few. As a non-limiting example, much of the appeal of blockchain and DLT-based platforms can lie in their use of a distributed ledger, either centralized or decentralized, in which an immutable global record can emerge of the various transactions performed on the network. Further, the ability to clear and settle assets in such a setting, along with the rise of new "smart contracts" that can automatically trigger additional steps such as recording ownership changes or authorizing payments can have far-reaching implications.

However, generally speaking, DLT-based platforms as well as ledger technologies and DLTs can inherently comprise certain drawbacks and problems. More specifically, as will be described in more detail below, in centralized ledgers, DLTs and other ledger technologies, certain technical problems can arise due to trust or lack thereof in the time priority assignment or other priority assignment, ordering and/or matching transactions among a plurality of users and computing systems communicating through an electronic network. Some embodiments described herein address such technical shortcomings in ledger technologies by using, in certain embodiments, a cryptographic commitment. In traditional market settings, a fundamental problem facing data exchanges, trading systems, and traders can relate to how to hide or mask their trades and/or trading intentions from other trading systems/traders. As further described herein, disguising a trade's "footprint" can be necessary to keep other entities from copying, or even worse, "front-running" your trades, thereby extracting rents that should have been yours. Problems relating to information or data leakage can also arise in electronic distributed ledgers. In particular, substantial problems can arise in the context of DLTs and DLT-based platforms, because even though the transactions in, for example, a blockchain may be timestamped, there may be no actual time priority or other priority assignment in the process of getting a transaction validated and/or onto the distributed ledger. For example, in many DLT-based platforms, there is no guarantee that an order will receive a time priority assignment or other priority assignment that is at the time of ordering or substantially near the time an order is placed, or that certain orders will not be processed ahead of other later submitted orders, or that miners, leaders, or other processors will not process orders from certain traders ahead of orders from other traders. Consequently, third parties may be able to view a first order placed by a trader before the first order receives a time priority assignment or other priority assignment. The foregoing can allow such third parties to submit the same or similar or other second order that is based on or responsive to the information in the first order. In some instances, the second order may be processed by a miner, leader, or other processor and assigned a time priority or other priority assignment ahead of the first order. As a result of this technical shortcoming in the specific architecture of certain electronic ledger technologies, such as ledgers, DLT, blockchain, and the like, information or data leakage, for example relating to trade orders or other messages being transmitted on such platform, can arise in the interim period between the publication of such a transaction or other message and its validation (for example, time priority assignment or other priority assignment) by miners or designated entities/participants, exposing other entities/participants in the ledger to potential front-running and manipulation. In other words, in existing electronic ledger platforms, whether distributed or not, such as centralized ledgers, DLT and blockchain-based technologies, the lack of time priority or other priority assignment in the process of ordering transactions before writing them to the distributed or centralized ledger can potentially open the door to the manipulation of the order of trades or other messages and also insertion of trades or other messages based on information of others' trades or messages.

As used herein, the term time priority assignment can refer to the actual or other priority assignment based on time but can also include priority assignment based on other schema. For example, priority can be assigned in many ways to the commitments (based on when the board receives the messages, for example, based on time, or randomly, or based on a pattern, or based on a predetermined assignment table, or the like). In some embodiments, priority order can be based on any ordering of commitments, wherein the ordering is done fairly or or otherwise, as the commitments reveal insufficient information about the orders themselves. In some embodiments, the priority is for specifying how order matching is completed when a processor (for example, a miner, leader, order publication board or the like) identifies two different orders in a same trade pair. For example, if the order matching system identifies or sees two trades for GOOG/USD in the same time period, the system configured to know which to match with the corresponding USD/GOOG trade first based on the priority assignment (whether based on time or other priority schema) assigned to each order. In some embodiments, priority assignment is not based on a global assignment, but rather only relative to other orders in the same pairing. For example, in some embodiments, the system is configured to reveal the trade pair (e.g. GOOG/USD) and is configured to only specify the relative priority of GOOG/USD and does not specify the relative order of GOOG/USD trades with AAPL/USD trades.

Such technical problems inherent and specific to centralized ledgers, DLTs and other electronic ledger technologies must be resolved for the development of additional electronic ledger platforms and the improvement of the ones in existence today. For example, DLT-based platforms can potentially revolutionize the actual trading of financial assets. Such a development may require a completely new form of market, one where order execution is not handled by a centralized entity but in a decentralized manner not controlled by any one organization. Also, centralized ledger systems are known to have problems with the trust that must be given to the order matching entity who may front run, enable front running, or otherwise act unfairly as to the time priority or other priority of assignment of orders before they are matched. Before such a market structure can evolve, however, problems relating to susceptibility to information leakage and front-running inherent in centralized trading, decentralized trading and/or DLT must be first addressed. In some embodiments, the systems disclosed herein can utilize a trustless order matching system that employs a cryptographic commitment, for example, a cryptographic hash commitment, to address the issue of information leakage and/or front-running issues inherent in centralized trading platforms, decentralized trading platforms and/or DLT platforms.

As will be described in more detail herein, some embodiments of systems, devices, and methods described herein provide specific and detailed solutions to address such technical problems relating to data leakage arising in the context of electronic ledger technologies, including centralized ledgers, distributed ledger technologies (DLT) and blockchain, to provide a trustless order matching system for an electronic ledger platform, centralized trading platform, or DLT-based platform. By providing an innovative approach to dealing with data leakage in a distributed ledger setting, some embodiments described herein can also enable and facilitate trading in distributed ledgers themselves, opening the way to even greater applications of DLT. To date, proposed uses of distributed ledgers focus mainly on post-trade clearing and settlement where there is little ability to profit from any information leakage. In market settings, however, where information leakage is important, some embodiments described herein can be implemented in conjunction with distributed ledgers to operate decentralized markets that safeguard participants' information. By utilizing certain techniques described herein, information or data leakage problems arising from the architecture of distributed ledger technologies can be solved, thereby greatly expanding the feasibility of certain distributed ledger applications. In particular, some embodiments described herein can provide secure, auditable order matching and resolution on a distributed or non-distributed system, and more particularly, include techniques to establish global ordering of messages, trades, orders, or the like on the system independent of the content of the messages, trades, orders, or the like. As such, certain systems, devices, and methods described herein can provide or allow for implementation of a trustless order matching system for electronic ledger technologies, such as centralized ledger platforms, DLT-based platforms or blockchain-based platforms.

More specifically, as briefly described above, in certain electronic ledger technologies, such as centralized ledgers, DLT or blockchain, the time period between the publication of a trade order or other message and processing of the same to be written onto the centralized, distributed or other ledger or other board or order posting system (for example, Twitter or social media platform or newspaper or publication or website or DLT or blockchain or the like, which can all be publicly or privately viewable) can lead to data leakage and, in turn, potential front-running or other data manipulation. Some embodiments described herein can be configured to provide technical solutions to improve current ledger technologies, current exchange/order matching platforms, DLTs or other electronic order posting and/or matching platforms and address this problem in exchanges and/or order matching platforms based on electronic ledger technologies and distributed electronic ledger technologies, such as centralized ledger technologies, DLTs and blockchain, for example, by use of cryptographic commitments. More specifically, in some embodiments, cryptographic commitments, such as for example, cryptographic hash commitments, can be published on the electronic ledger platform (or other publication board or posting system) first without disclosing the actual underlying trade order or other message order data that a user intends to place. The cryptographic commitment can be generated from a trade order and/or other message that the user intends to place. For example, in some embodiments, the cryptographic commitment can be realized or generated by a hash function and/or other cryptographic constructions or schemes. As such, the cryptographic commitment can be a cryptographic hash commitment or other cryptographic commitment. The cryptographic commitment can be configured such that it is technically impossible to determine the corresponding, correlating, or underlying trade order or message data from the cryptographic commitment.

In some embodiments, the cryptographic commitment initially published on the electronic ledger platform can be used to assign time priorities instead of the actual trade order or other message that was used to generate the cryptographic commitment. In other words, in some embodiments, a time priority or other priority assignment for each trade order or other message placed on the electronic ledger platform can be assigned while hiding or without actual knowledge of the corresponding, correlating, or underlying trade order or other message data. As it can be technically impossible or computationally infeasible to determine the correlating trade order or other message from the cryptographic commitment, in some embodiments, it can equally be technically difficult or impractical to assign time priorities based on the actual trade order or other message data corresponding or correlating to the cryptographic commitment, thereby avoiding the opportunity for certain orders to receive preferential processing over other orders based on the actual trade order or other message data in the order. In some embodiments, the use of cryptographic commitments can prevent third parties, such as miners, leaders, processors, third-party traders, and/or other entities from knowing and/or determining the identity of the entity that placed the order and/or submitted the cryptographic commitment, thereby avoiding the opportunity for certain orders to receive preferential processing over other orders based on the entity that placed the order. Further, as the actual trade order or other message is not disclosed at the point in time when time priorities are assigned to the trade order or other message, in some embodiments, such platforms can effectively prevent other entities from copying or front-running one's trades or messages and/or manipulating the priority of one or more trade orders.

In some embodiments, only after time priorities are assigned to one or more cryptographic commitments are the corresponding or correlating trade orders or other messages revealed for purposes of matching the trade orders or other messages with others. By this point, however, time priorities for the trade orders or other messages have already been assigned and determined. As such, in some embodiments, there can be no possibility of using the revealed trade orders or other messages unfairly to one's benefit, whether it be by front-running, manipulating a trade order or message, preferentially revealing the order information to some parties, or copying the same. In other words, in some embodiments, as the time priorities are already assigned and locked in, it can be substantially risk-free to disclose the underlying trade order or other message that corresponds or correlates to the previously revealed cryptographic commitment. As such, in some embodiments, one or more problems arising from information or data leakage in electronic ledger technologies, such as centralized ledger technologies, DLT and blockchain, can be addressed/solved using cryptographic commitments, such as a cryptographic hash commitment, to reserve a transaction's time priority or other priority assignment. Once the time priority or other priority assignment is established, a second message revealing the underlying trade order or other message can be subsequently published for matching the trade order or other message. In a sense, the cryptographic commitment can be thought of as an order's "fingerprint," to hide its "footprint," or the actual order details on the electronic ledger platform, such as a centralized ledger platform, DLT-based platform or blockchain-based platform.

As briefly discussed, some embodiments described herein can be applied to trading applications and/or other data exchanges on distributed or non-distributed ledgers, including but not limited to dark pools or DLT-based exchange platforms, and thereby solve information or data leakage problems that may arise on a such distributed or non-distributed ledger trading platform or other data platform. For example, in some embodiments, a cryptographic commitment, such as a hash commitment (which can be understood in some embodiments as a type of digital "fingerprint") can be used to secure time-priority, which can then followed by a second communication revealing more features of the underlying market transaction other message. Because the initial hash or other cryptographic commitment does not reveal any information relating to the trade or other message, the ability to front-run a trade or other message before it is stored in the distributed or non-distributed ledger can be eliminated. In some embodiments, using a "fingerprint" of a trade order or message to hide its "footprint" removes the ability to manipulate the order of transactions or messages and so restores time priority or other priority assignment to the validation process.

In other words, in some embodiments, to avoid the risk of electronic front-running and other manipulative practices by a potentially dishonest centralized exchange or platform or a temporary leader or miner(s) in a decentralized network, a global ordering of messages (e.g., order messages) can be established in centralized and/or distributed systems independent of the content of the messages using cryptographic techniques, such as cryptographic commitments. By using cryptographic techniques, time priority or other priority assignment of a message (e.g., order message) in a network can be established separately without having to reveal the contents in the message to the network (e.g. the asset, the price, the quantity, etc.). If the time priority or other priority assignment of a message is established prior to the content in the message being revealed, a network party that is ordering the transactions and/or messages will not have the ability to manipulate the market or other data exchange operating on the network; all commitment messages will be effectively or computationally indistinguishable, and this party loses its foreknowledge of market behavior derived on its special role in the network. As a non-limiting example, cryptographic commitments are generally constructed to have the same output length. In other words, independent of the input message length, the length of the commitment is the same in some embodiments. As such, one cannot distinguish different commitments from the output length in some embodiments. One can add additional random values to a commitment, but that would be essentially the same commitment scheme in some embodiments. The party that is ordering the messages and/or transactions would therefore not have an incentive to misreport the order in which the messages were received. In some embodiments, only after the time priority or other priority assignment of a message is established for all network participants, the contents of the message can be revealed to the network, and the actual order matching can take place. Once network participants view and/or access the time priority or other priority assignment of the order messages, these participants can "trustlessly" verify that the orders are matched correctly, according to their time priority or other priority assignment.

However, in order for such a trustless order matching system to operate, it can be advantageous to allow its participants to be able to verify that the cryptographic commitment that was disclosed to determine time priorities actually corresponds or correlates to the later revealed underlying message or trade order. If not, certain participants may have an incentive to reveal a different message or trade order after being assigned a time priority or other priority assignment. Further, other participants may have reason question or doubt the correlation or correspondence between a cryptographic commitment and a later revealed trade order or message. As such, to address such technical problems arising in the realm of computer-based ledger technologies, such as centralized ledger-based platforms, DLTs and blockchain-based platforms, some embodiments herein can allow any third-party or other network or platform participants to confirm, audit, or verify that a later revealed message or trade order does in fact correspond or correlate to the previously disclosed cryptographic commitment that was used to assign time priorities. More specifically, in some embodiments, third parties or other network or platform participants can regenerate the cryptographic commitment based on the later revealed trade order or other message. If the subsequently regenerated cryptographic commitment matches the previously revealed cryptographic commitment used to determine time priorities, then third parties can verify the correspondence or correlation. If not, the system or third-party authority can assess, impose, or cause to impose a penalty on the user that subsequently revealed a trade order or message that does not correspond or correlate to the previously disclosed cryptographic commitment.

In addition, another problem in such trustless order matching system can be that one or more users may prevent or decide not to reveal the actual trade order or message after the time priority or other priority assignment is assigned. For example, for one reason or another, a user may determine that the time priority or other priority assignment assigned to that user's trade order or message is not beneficial or ideal, and therefore may decide not to subsequently reveal or disclose the correlating trade order or message, thereby preventing matching of the user's trade order or message. In some embodiments, the system can be configured to prevent such user decisions by automatically disclosing or revealing the trade order or message, for example after a predetermined period of time or after time priorities have been finally determined or confirmed for a predetermined number or size of trade orders or messages. However, even in such situations, a user may still be able to prevent the automatic revealing of the corresponding or correlating trade order or message. In order to prevent such behavior, in certain embodiments, the system or third-party authority can assess, impose, or cause to impose a penalty on the user that subsequently prevented disclosure of a trade order or message after revealing a cryptographic commitment and/or after being assigned a time priority or other priority assignment for the user's cryptographic commitment.

Data/Information Leakage

Time priority or other priority assignment can be a crucial component in trade order matching systems, whether it is a distributed system or a non-distributed system. Most distributed systems having multiple nodes (e.g., computers) connected together in a network, however, do not have a global ordering of events. In some distributed systems, a network event can occur when a message is published on the network. Traditionally, in order to establish time priority or other priority assignment of messages in distributed systems, a central party such as an exchange, is trusted to establish a global ordering of events based on when the central party accesses and/or views messages from the rest of the network. In some instances, such a system, however, may breakdown due to lack of trust. Two such instances include: 1) instances when the exchange cannot be trusted to act honestly, for example for its own profit and 2) instances when there is no central authority, for example in a decentralized computer network (such as a distributed ledger) with a purely decentralized exchange and with no trusted network participants whatsoever. Sometimes, in centralized markets in particular, a perennial concern can exist that so-called dark pools may be engaging in manipulative practices. At present, however, mechanisms do not exist to verify that such manipulation does not occur.

In computer networks that do not include a trusted authority to assert a global ordering of events, the order matching process can be manipulated so that one or more network participants may profit from the ambiguity. For instance, a dishonest centralized exchange can engage in electronic front-running, by inserting its own order messages, in the order queue in front of another order message that the centralized exchange has just seen on the computer network. In the presence of such a practice, it can be challenging for any other network participant to prove that the exchange did not construct its fabricated order before the order message it was placed in front of. A similar situation can arise on decentralized networks, where a miner, order, or consensus leader can engage in a similar practice, also without detection by other network participants. In a decentralized network, a miner, orderer, or consensus leader can refer to particular parties that are temporarily given the authority to establish or propose a global ordering (within a particular time frame and/or on a small or particular scale for example) of network events. Other manipulative behavior by the party establishing the ordering of messages can include simple message censorship. Unlike a centralized exchange where the manipulative behavior can include both ordering messages and matching them, in a decentralized case, the miner can establish a message priority but may not necessarily perform the match itself. In such cases, the match can be performed by the network protocol in a smart contract.

In order to better understand how data or information leakage can occur, it can be useful to set out the distinction between centralized and decentralized systems, and see their differences affect transactions processing. Centralized systems, such as centralized exchanges, can have a single trusted party, usually in a single location, processing transactions and assigning timestamps to them. In contrast, in decentralized systems such as the Bitcoin blockchain, there generally is no trusted party. Decentralized systems can instead rely on a network of untrusted, independent parties executing an algorithm to process transactions. One part of this process in decentralized systems is the sequencing of transactions, where each transaction is assigned a timestamp and an order relative to every other transaction. As will be detailed further, the limitations of this sequencing process set the stage for data or information leakage to occur.

In certain decentralized systems such as Bitcoin, due to transmission delays in a network, it can be impossible to reach agreement on the actual order in which transactions happen. Such latency issues can be a problem in the current high frequency market structure characterizing equity or futures trading, but the problem in a decentralized system can be exacerbated by the fact that there is no central party trusted to order the transactions. As a result, the various algorithms employed in a distributed ledger can only attempt to make all parties in the network agree on what (for short time intervals) is essentially an arbitrary ordering of the transactions. As a non-limiting example, in the period between the broadcast of a Bitcoin transaction and it being processed by the network, there are no guarantees offered with regards to its order relative to other transactions in the same state or to what timestamp the transaction will eventually be assigned.

Importantly, the content of any transaction, which can include events such as a trade, a quote, an indication of interest, and/or the like, that will be posted to the distributed ledger can be observable by all or parts of the network in this period. This visibility can allow other participants/entities to act upon the information carried in the transaction before it has been processed and received a guaranteed ordering relative to other transactions. Depending on the algorithm employed, some participants/entities, who are untrusted, may also be able to alter the relative ordering of transactions, arbitrarily and potentially unfairly to their own benefit. And, depending on the extent of these alterations, any changes can range from being undiscoverable to the rest of the network, to being probable but unprovable. Once the transaction is processed by the network, it can be permanently stored and given a definitive place in the order sequence in the distributed ledger. Only at this point can it be possible to offer the guarantee that no new transactions end up with an earlier time priority or other priority assignment than the original transaction.

While the lack of time priority or other priority assignment in the validation stage can apply generally across distributed ledger settings, the validation process employed in such systems may differ. For example, public distributed ledgers can use miners and private distributed ledgers can use an elected leader/component to validate transactions. But regardless of the method used, the basic problem can be the same: one party can be temporarily trusted with ordering the transactions because there can be no global agreement on a natural ordering of transactions.

More specifically, in a public distributed ledger system, such as the Bitcoin and Ethereum networks, transactions are processed by miners or high-powered computers that compile these transactions into chunks (known as blocks), and collect the fees associated with each transaction. There can be numerous miners on the network, and which one writes any given block is generally unknown in advance, with the probability of doing so equal to their share of mining power relative to the total. Generally speaking, when a transaction is broadcast, it is forwarded by the network and kept in a transaction pool known as a mempool. When a miner mines a new block, it can consist of transactions from this mempool. The miner can reorder or censor transactions as they see fit, to the point where empty blocks (with no transactions) are perfectly valid. This behavior, combined with infrequent generation of blocks, can result in unpredictable delays between a transaction being broadcast and it being assigned an order relative to other transactions in the distributed ledger. These delays in Bitcoin have typically been around ten minutes, but they can be much longer due to there being no theoretical upper bound on how long it can take.

In many instances, miners can be agnostic to the content or source of transactions, and they may seek to optimize their own returns by including as many transactions as possible in each block and thereby collecting transaction fees. Such miners may not have any incentive to manipulate the relative order of transactions, but neither will they have any interest in keeping transactions in any particular order. Thus, transactions containing conflicting orders may be shuffled arbitrarily for a time-period of multiple minutes.

Certain other miners, however, may have motives beyond simply collecting transaction and block-fees. For example, they may decide to inspect the orders awaiting processing in the mempool, and then put in their own conflicting orders in front of the other orders. The fact that they can blame the resulting sequencing on network delays, which do occur in decentralized systems, makes this a difficult problem to address. Further, the fact that most miners are anonymous only contributes to the difficulty of knowing whether such data snooping and front-running has actually occurred. What is to be understood is that there should be no expectation of privacy for broadcast data in a public distributed ledger.

In contrast to the public distributed ledgers described above, there are also private distributed ledger systems. In such systems, such as the Symbiont Assembly and Hyperledger Fabric, an elected leader can be responsible for processing transactions for a given period of time. These leader-driven systems do not necessarily operate on blocks, but the transactions can be similarly written to a distributed ledger. Relative to Bitcoin, the delay between a transaction broadcast and it being written to a private ledger can be much shorter, often on the order of seconds for a global system. However, such a delay can still provide enough time for other participants/entities on the network to broadcast their own transactions with conflicting orders in them.

Similar to Bitcoin miners, the elected leader/component can have the freedom to order transactions relative to each other, temporarily taking responsibility for providing a canonical ordering of transactions when there is no trusted party to do so. Indeed, the problem can be exacerbated by the fact that the leader/component in this kind of system can know ahead of time that it is the one responsible for writing transactions to the ledger, and can plan accordingly. By the rules of such systems, only when a transaction is outright censored or delayed for a long period of time, such as several seconds, does a leader-election algorithm kick in and change the system over to a different leader. As in Bitcoin, any leader/component may have no obligation to order transactions in the order it received them, and network delays can make the perceived order different for different observers, making it impossible to prove suspected willful reordering.

As such, at least two features of distributed ledger systems can be considered to be the cause of such technical shortcomings. The first is that distributed ledger systems are distributed by technical design; geographically disbursed nodes may receive transactions in a different order due to network delays. Second, as distributed ledger systems are decentralized, there can be no central authority that can be trusted to resolve the differences in order. Thus, such lack of global time priority or other priority assignment can set the stage for data or information leakage and potential front-running in any distributed ledger system.

Cryptographic Commitment Scheme

As described above, some embodiments of systems, devices, and methods described herein provide specific and detailed technical solutions to address problems relating to potential data leakage arising in the context of electronic ledger technologies, such as centralized ledgers, distributed ledger technologies (DLT) and blockchain-based platforms, to provide a trustless order matching system.

In furtherance of the above, some embodiments described herein are configured to utilize one or more cryptographic techniques, schemes, or other mechanisms for generating commitments to establish time priority or other priority assignment of a message to be placed on an electronic ledger network independent of its content. As such, some embodiments can be said to employ a cryptographic commitment scheme. In some embodiments, a cryptographic commitment to a message can be a piece of data that is computed based on the message content and (optionally) an auxiliary value or a value that may or may not be related to the message content, and the cryptographic commitment can comprise one or more or all of the following three properties: (1) The cryptographic commitment hides the message content, for example, hide, conceal, remove, eliminate all or substantially all or enough of the message content (in other words, allow for some data leakage) to prevent front-running and/or prevent the order matcher (for example, a miner or other processor) from favoring one entity over another, or allowing one or more actors from profiting from the message information of another actor, or otherwise cheat in the system. In other words, it is computationally infeasible to find information about the message content given the commitment. (2) The party that computes the commitment cannot later change the original message content without changing the commitment. In other words, it is computationally infeasible to find a message content different from the original message content that will yield the same commitment. (3) Given a message content, an auxiliary value, and a commitment value, any party can verify whether the commitment value is the valid commitment for the message content. For these properties, it can be computationally infeasible or difficult to determine the message content from a cryptographic commitment. Hence, a cryptographic commitment can be used to commit to a value before the value itself is revealed. In some embodiments, a cryptographic commitment can be realized by the system or cryptographic platform thereof by a cryptographic hash function where the auxiliary value can be a random value or any other construction or scheme that satisfies the above three properties of a cryptographic commitment. In some embodiments, a cryptographic commitment is configured to use an encryption scheme where the auxiliary value can be the encryption key. In some embodiments, any party can verify the validity of the commitment given the message content and the encryption key by encrypting the message content with the key and checking whether the ciphertext is equal to the commitment. Other examples of cryptographic commitment schemes that can be used with the embodiments disclosed herein include pseudorandom number generator (PRG), one-way permutation (OWP), asymmetric signature, and Pedersen Commitment, among others.

In some embodiments, a cryptographic commitment scheme can be used to prevent traders from changing their orders between the time when the time priority or other priority assignment of their order message is established and the time when the order message itself is broadcast. In some embodiments, the system can be configured to utilize a multi-stage protocol. The multi-stage protocol can comprise a commitment stage, content publication stage, and an order matching stage. In other words, in some embodiments, the multi-stage protocol can comprise two separate publication stages: the commitment stage and the content publication stage.

In some embodiments, in the commitment stage, each market participant can publish their respective order commitment to the network so that all participants within the network can view all the order commitments. This can be used to establish time priority or other priority assignment of their respective order message and to commit to the contents within the order message. Further, the exchange or network can be configured to timestamp the commitments that are published during a given time frame.

In some embodiments, in the content publication stage, after timestamps are in place, each market participant can publish the contents of the order message that has been timestamped to the network.

In some embodiments, in the order matching stage, the exchange or network can first verify that the order messages of network participants correspond or correlate to the commitments that the network participants have previously published, remove the order messages that are invalid, and finally matches valid timestamped orders. In some embodiments, each market participant can verify that order matching has occurred according to the time priority or other priority assignment of the message. In certain embodiments, each market participant can also verify that the orders of the network participants correspond or correlate to the commitments they have published previously.

In some embodiments, under the multi-stage protocol, it is strongly preferred that all traders publish the contents of each previously published commitment. Otherwise, a trader can use the period between publishing an order commitment and revealing the content of the message to observe market movements and to recognize that a trade may not be profitable when it is finally executed. In such a circumstance, the trader may wish to withhold the contents of the order from the network, to avoid allowing it to be executed. This would constitute undesirable behavior. Consequently, whether by the use of a cryptographic bond in a smart contract on the network, or an out-of-band punishment (e.g., in financial form), in some embodiments, all traders are required to publish the contents of their orders corresponding or correlating to each of their commitments, within a desired time period (the length of which depends on market conditions). Every network participant can detect when this condition has not been met by any other network participant. In some embodiments, if a market participant prevents publication of the contents of the order message or otherwise does not publish the contents of the order message after a time priority or other priority assignment is assigned to the market participant's order commitment, the system can be configured to penalize that market participant.

The technology disclosed herein can be stored as a program component that is executed by a processor such as a central processing unit (CPU), for example at every node within a distributed ledger. The features and embodiments discussed herein enable implementation of cryptographic commitment schemes to enable global ordering of messages.

The cryptographic commitment schemes can be developed by employing standard development tools and languages such as, but not limited to: Apache components, Assembly, ActiveX, binary executables, (ANSI) (Objective-) C (++), C# and/or .NET, database adapters, CGI scripts, Golang, Java, JavaScript, mapping tools, procedural and object oriented development tools, Pascal, PERL, PHP, Python, shell scripts, SQL commands, web application server extensions, web development environments and libraries (e.g., Microsoft's ActiveX; Adobe AIR, FLEX & FLASH; AJAX; (D) HTML; Dojo, Java; JavaScript; jQuery (UI); MooTools; Prototype; script.aculo.us; Simple Object Access Protocol (SOAP); Representational State Transfer (REST); SWFObject; Yahoo! User Interface; and/or the like), WebObjects, and/or the like.

Cryptographic Hash Commitments

As described above, some embodiments of systems, devices, and methods described herein are configured to utilize a two-stage publication protocol, in which cryptographic commitments are first published without disclosing an underlying message or order. Time priorities can be assigned based on the cryptographic commitments, without revealing the actual message or order. Only after the time priorities have been determined or finalized, the underlying message or order can be published, which can subsequently be matched based on its content.

In some embodiments, the cryptographic commitment scheme can be configured to utilize one or more cryptographic hash functions or other cryptographic schemes. Generally speaking, a hash can be a code generated by a cryptographic hash function and tied to any arbitrary set of data. A cryptographic hash function can be a mathematical algorithm that performs a one-way transformation on a message consisting of arbitrary data, producing a cryptographic hash value. One-way can mean that reversing the algorithm and learning anything about the original data is infeasible. On the same note, any small change in the original data can result in an extensive change in the corresponding or correlating hash value, making it look uncorrelated with the first hash value. This property can also make it infeasible to find two different messages that produce the same hash value.

Cryptographic hashes can be the mathematical equivalent of fingerprints. Just as a fingerprint is a unique identifier of a person, a cryptographic hash can be a unique identifier of some data, such as a text document, image, or offer to buy a stock. One example use-case of hashing is a situation where someone wants you to be able to verify that your copy of a document is an exact replication of their copy. Once you have been given the hash, even if the document is sent over an unreliable or untrusted channel, the hash can allow you to verify that you received the correct and unchanged document. The analogy would be using the fingerprint of a person to identify them; you may know nothing else about the person, and the fingerprint does not let you deduce any information about them, but once the person shows up, you can verify that he or she is the one you expected.

As discussed, a hash can be next to impossible to guess without having access to the corresponding, correlating, or underlying data, and it can be similarly hard to reverse the process to uncover the corresponding data. It can also be statistically impossible for two different sets of data to generate the same hash, even if the two sets of data are very similar.

However, with a naive approach to hashing, data that is identical will produce the same hash, potentially leaking some information about the trader's intentions if that data is an offer to trade on a market. For instance, data that is identical can be a repeated order, either at a later time or to a different market, be recognized, and have its content leaked. As such, some embodiments herein address this technical issue, for example by extending the data input into the hash function with an additional field. The additional field can be without any semantic meaning. For example, the field can be a timestamp or a random number. In some embodiments, this field can be stripped before parsing the data, but can have the effect that otherwise identical data will now produce different hashes if different values are put into this extra field.

A cryptographic hash function in certain embodiments can be a one-way function of an arbitrary input to a fixed-length string (the "hash" of the input). In cryptographic hash functions, it can be easy to calculate the hash from the input but impossible or excessively difficult and time consuming to calculate the input from the hash. Some non-limiting examples of hash functions are SHA-2 and SHA-3.

A hash commitment can refer to the use of a hash to commit to a set of data without revealing the data. Simply put, the actor that knows the data can generate a hash from the data and publishes the hash to whomever is interested in the commitment. At a later stage, when the data becomes known to other parties, they can verify the relationship between the data and the hash, and thus verify that the data has not been changed since the commitment.

In some embodiments, a hash can be verified by re-computing the hash from plaintext value once posted and by comparing it to the previous value. Verification can be done by network participants that are involved in achieving distributed consensus. Hashes can be extremely fast to calculate, so flooding the system with hashes can have no greater danger than flooding the system with any other kind of data, given the speed with which hashes are computed.

Example Cryptographic Hash Commitment Techniques

As described above, some embodiments of systems, devices, and methods described herein are configured to generate or realize cryptographic hash commitments based on a message or trade order that a user intends to place on an electronic ledger platform, whether distributed or not. The following provides a general description of an example cryptographic hash commitment scheme. However, other cryptographic schemes or commitments can also be utilized.

In particular, let H be a cryptographic hash function, and let M be a message that represents the contents of a market participant's order and T be the time of the order. Let C be a commitment. Then in the two-step publication protocol in some embodiments, the commitment C can be computed as C=H (M, T, extra data). The extra data, which can be called salt, can be a random value generated by the participant to prevent brute force search of the input M given the commitment C.

In some embodiments, each market participant and the exchange possesses a public/private key pair. As such, the market participants can sign messages such as the commitment messages using the private key and each party within the network can verify the validity of the message using the corresponding public key.

In some embodiments, each market participant can first generate random extra data (e.g., salt), compute hash commitment C=H(M|T|salt), where x|y is the concatenation of x and y, and publish C in view of participants within the network, to establish time priority or other priority assignment T of the market participant's order and commit to its contents M. In some embodiments, each market participant can additionally sign the commitment C using the private key.

In some embodiments, the exchange or network can timestamp all hash commitments C that are published during a given timeframe. In some embodiments, a timeframe can be a part of the protocol. In some instances, the timeframe can be one second. In some embodiments, the timestamp can be computed as a digital signature on the message that is the concatenation of all the hash commitments from every network participant within the given timeframe, using the exchange's private key.

In some embodiments, after timestamps have been published on the network, each market participant can publish the contents of the order (M, T, salt) to the network. In some embodiments, the exchange or network can match the orders based on all the published pairs (M, T). In some embodiments, each market participant can verify that order matching occurs according to the time priority or other priority assignment of the message including the hash. In some embodiments, each market participant can verify that the orders of other network participants correspond to the hashes they have published previously. For example, this is done by computing C'=H(M|T|salt) and verifying that C'=C for each order.

Example(s) of Cryptographic Hash Commitment for a Decentralized Trading Platform As a non-limiting example, one or more embodiments herein can be applied to financial markets. However, in order to do so, as discussed above, the ability of miners or leaders to unfairly profit from trading on the information in a market participant's transaction must be removed. Once a market participant's transaction is written to the distributed ledger, the problem can be largely ameliorated, but it is in the preceding processing stage when miners or leaders can inspect the transactions they are supposed to be ordering that information leakage can occur. As such, one starting point for a solution can be to consider changing how this initial processing takes place, with the aim of establishing strict time priority or other priority assignment for transactions.

As such, in some embodiments, the system can be configured to utilize cryptographic hash commitments in decentralized networks to hide information in any decentralized offer matching. For example, a trader or trading system wishing to publish an offer to the decentralized market, potentially intending to match against an offer already on the order book of the market, can craft an offer according to the trading protocol of the decentralized market but, crucially, postpone the publication of the offer.

More specifically, in some embodiments applied to financial markets, the details of a trade order can be run through a cryptographic hash function first, producing an identifier or hash value or other value mathematically linked to the order, but not exposing any details of the order itself, other than the fact that some trade is desired. Broadcasting that hash value and waiting for it to be processed by the system can reserve an order's time priority or other priority assignment. Once the priority is secured, the order itself can be broadcasted. At this stage, the information or data leakage may not be of any concern as all involved in the market will recognize the relationship between the order and its corresponding hash value, thus executing them at the reserved time priority or other priority assignment.

In other words, in some embodiments, the trader can publish a hash of the offer to the underlying ledger, the hash commitment. Once this commitment has been irrevocably written to the ledger and assigned time priority or other priority assignment, the full offer can be published to the same ledger.

In some embodiments, the system is configured to use the hash of a financial order to lock in a time priority or other priority assignment for that order. The user/user system can craft/generate the order they want to execute and keep it confidential, but publish the hash. In some embodiments, no one receiving the hash will be able to deduce any information about the order, but at a later time when the full order is published, it is straightforward to verify that this is the order used to generate the hash. In some embodiments, any modification to the order after publication of the hash, by the creator or others, will be plainly visible. This can reduce, remove, and/or eliminate the incentive to re-order transactions. In other words, as the hashes are devoid of meaningful information, the incentive to delay orders, and more importantly, the ability to act on any information in other participants' orders may be removed.

In some embodiments, the second stage of the process involves broadcasting the details of the transaction. This can occur once the hash has been processed and assigned an index and timestamp. With time priority or other priority assignment established, information leakage may not be a problem because all market participants will recognize the relationship between the transaction and its corresponding hash value, thus executing them at its reserved time priority or other priority assignment.

In some embodiments, a decentralized market can be configured and/or extended to expect this two-stage offer publication. The decentralized market can be configured to perform the offer matching after a delay, and with time priority or other priority assignment of the offers inherited from the matching hash commitments. To avoid potential manipulation, traders can be sufficiently dis-incentivized through fees and/or other inducements from publishing a hash for which they do not eventually reveal the plaintext value.

In some embodiments, the process can entail a general delay in the execution of orders. More specifically, in a setting in which participants can set out offers to buy or sell an object, if a market receives a hash, then the sender has to be given time to broadcast their actual offer before any other offers can be executed. This can be accomplished with a timeout. For example, after a hash has been written to the ledger, the sender can be given a certain time interval to broadcast their offer, or their time priority or other priority assignment is forfeited. The network as a whole can verify that the offer matches the hash broadcast previously. To allow for normal delays, this timeout can be for a set time period. For example, the predetermined timeout period can be on the order of seconds in a private distributed ledger or minutes for a public distributed ledger, like Bitcoin. In particular, the timeout period can be about 1 second, about 2 seconds, about 3 seconds, about 4 seconds, about 5 seconds, about 10 seconds, about 15 seconds, about 20 seconds, about 25 seconds, about 30 seconds, about 35 seconds, about 40 seconds, about 45 seconds, about 50 seconds, about 55 seconds, about 1 minute, about 2 minutes, about 3 minutes, about 4 minutes, about 5 minutes, about 10 minutes, about 15 minutes, about 20 minutes, about 25 minutes, about 30 minutes, and/or within a range defined by two of the aforementioned values.

Market-Based Example(s)

For illustrative purposes, an example of a cryptographic hash commitment scheme applied to a financial trading platform is provided herein. In particular, some embodiments of a cryptographic hash commitment platform as described herein can be applied to a trading platform that is running on top of a blockchain or other distributed ledger technology-based platform. The underlying ledger can be decentralized and the platform can utilize on-ledger, decentralized matching of offers.

Assume in this illustrative example that Alice wants to buy 100 shares or other units of AXAX, which is a financial asset. Alice can check the order book of the trading platform and see the following orders: (1) sell 50 AXAX at $89; and (2) sell 100 AXAX at $90.

Suppose that these orders were created by Bob, a malicious trader who owns a mining pool. Bob can watch the AXAX mempool to intercept matching orders. Alice, without knowing this can put in a market order for 100 AXAX. When Alice's order arrives in the mempool, if the trading platform does not include any trustless order matching embodiments described herein, Bob can create a transaction to cancel the first order on the book and place the second order in the block before Alice's order. As such, when the market executes Alice's order, only the last of Bob's orders is still open so Alice executes at a price of $90, and not at the blended price of $89.50 that she expected.

However, by utilizing one or more embodiments for reducing and/or eliminating data leakage for trustless order matching, Alice or Alice's system could instead first craft a valid offer (i.e. she wants to buy 100 AXAX at 90), run a cryptographic hash algorithm, and publish this encrypted offer to the ledger. Alongside the hidden information in the hash, some visible information (termed "in clear") such as the market place name and the asset name can be published in some embodiments.

This information can be used to determine on what queue the offer should be added. Once the hash has been retained by the ledger, a place in the queue can be definitely attributed to Alice's offer. Now, Alice has the guarantee that Bob will not be able to insert a cancellation order in the queue before her offer. She can then publish to the ledger the offer in clear (i.e. not hashed and so with details visible to everyone). Once the offer details are retained by the ledger, the matching engine can execute the order at the blended price of $89.50 as expected by Alice. The transaction can then be posted to the ledger based on the time priority or other priority assignment established by the publication of the hash.

As illustrated in this example, in some embodiments discussed herein, no information or data leakage occurs because the initial hash revealed no relevant information that could be exploited by Bob before the offer's place in the queue is guaranteed. In some embodiments, once the initial hash is broadcast, the market must delay for a short period while the actual order is sent to the market. This latency can be on the order of the confirmation time of the ledger in question. The only requirement can be that once the hash has been broadcast and included in the global transaction log, its position therein should or must be indisputable. Furthermore, in some embodiments, there should or must be a strong, out-of-band penalty for Alice if she fails to publish the order in the clear before an agreed upon timeout. Without this penalty, the system could potentially be abused by publishing hashes for multiple orders and only revealing the plaintext of the hashes of offers that followed profitable market movements within the timeout interval. In some embodiments, the disincentives for doing this can be configured to be sufficient that it would difficult or impossible to make money this way. Generally speaking, the faster the network, and the shorter the timeout, the smaller the potential profit, suggesting that such market design features may alleviate this problem. As such, in some embodiments, the timeout period can be sufficiently short in order to mitigate this risk.

Embodiment(s) of Trustless Centralized Order Matching

Some embodiments of systems, methods, and devices for reducing and/or eliminating data leakage can be utilized to provide a trustless order matching system for an electronic ledger, such as a centralized ledger, a distributed ledger technology (DLT) or blockchain-based platform. In some embodiments, the trustless order matching can be centralized. FIG. 1 is a flowchart illustrating an overview of an example embodiment(s) of trustless centralized order matching. In the embodiment illustrated in FIG. 1, actions or events generally occur on a timeline, in which actions or events towards the top of the figure occur sooner than actions or events towards the bottom of the figure.

In addition, different actors or platforms are designated with different common identifiers in FIG. 1. For example, the trustless centralized order matching system and/or process illustrated in FIG. 1 refers to a User A and comprises a Cryptographic Platform, whose actions are identified in rounded boxes, and an Order Matching Platform, whose actions are identified in square boxes. The trustless centralized order matching system and/or process illustrated in FIG. 1 further comprises an Asset Ledger, which can be centralized or decentralized, whose actions are identified in box(es) with diagonal shading. In addition, the trustless centralized order matching system and/or process illustrated in FIG. 1 also comprises one or more Publication Boards, as will be discussed further herein. Furthermore, the trustless centralized order matching system and/or process illustrated in FIG. 1 also refers to a User B and comprises a User B platform, whose actions are identified in shapes with dotted backgrounds, such as 122 and 126. There are also actions that can be performed by third-parties, such as authorities or financial market auditors, or a centralized system, whose actions are identified in boxes with dotted boundaries, such as 124 and 130.

More specifically, as illustrated in FIG. 1, in some embodiments, a User A 102 can input a plain text comprising trade order information into a Cryptographic Platform. In some embodiments, the Cryptographic Platform can be configured to generate a trade order commitment at block 104 based on the inputted trade order plain text from User A For example, the trade order commitment can be a cryptographic commitment or a cryptographic hash commitment that does not disclose the actual corresponding trade order or trade order plaintext. In some embodiments, the generated trade order commitment can be posted or otherwise publicized on a Commitment Board 106. The Commitment Board 106 can be a database comprising one or more commitments received from one or more cryptographic platforms of a network. The Commitment Board 106 can be accessible or auditable by any users on the network or platform in some embodiments.

In some embodiments, the one or more trade order commitments can be transmitted to or otherwise accessed by an Order Matching Platform. The Order Matching Platform can be configured to generate one or more trade order priorities for the one or more trade order commitments at block 108. In some embodiments, the one or more generated trade order priorities can be posted or otherwise publicized on a Priority Board 110. The Priority Board 110 can be a database comprising one or more data sets of trade order commitment and associated time priorities that were assigned to that trade order commitment by the Order Matching Platform. The Priority Board 110 can be accessible or auditable by any users on the network or platform in some embodiments.

In some embodiments, the trade order priority can be transmitted to or otherwise accessed by the Cryptographic Platform. For example, User A can be allowed to verify the time priority or other priority assignment assigned to the Trade Order Commitment that User A inputted. In some embodiments, the Cryptographic Platform can be further configured to reveal the corresponding trade order plaintext that was used to generate the trade order commitment at block 112, for example optionally if/when User A verifies the time priority or other priority assignment.

In some embodiments, the trade order plaintext can be posted or otherwise publicized on a Trade Order Board 114. The Trade Order Board 114 can be a database comprising one or more sets of data of trade order commitment, time priority or other priority assignment assigned to the trade order commitment, and the corresponding trade order plaintext. The Trade Order Board 114 can be accessible or auditable by any users on the network or platform in some embodiments.

In some embodiments, the one or more trade order plaintexts and one or more trade order priorities assigned to those trade order commitments corresponding to the one or more trade order plaintexts can be transmitted or otherwise accessed by the Order Matching Platform. Based on the one or more trade order plaintexts and one or more trade order priorities, the Order Matching Platform can be configured to match one or more trade order plaintexts at block 116. One or more trade orders can be matched with one or more other trade orders, depending on the trade order information.

In some embodiments, after one or more trade order plaintexts are matched, one or more matched trades can be posted or otherwise publicized on a Trade Board 118. The Trade Board 118 can be a database comprising one or more trades. The Trade Board can be accessible or auditable by any users on the network or platform in some embodiments. In some embodiments, an Asset Ledger, such as a Centralized Asset Ledger or Decentralized Asset Ledger, can be configured to move one or more assets at block 120 based on the one or more trades.

As such, in some embodiments, as the time priorities are assigned based only on the trade order commitments and not on the corresponding or underlying trade order plaintext, the system can effectively reduce or eliminate trade manipulation or data leakage that can arise. However, in some embodiments, it may still be possible for a user, for example User A, to not reveal the trade order plaintext or even reveal a different trade order plaintext than that was actually used to generate the trade order commitment to which a time priority or other priority assignment was assigned by the Order Matching Platform. For example, there could be a situation in which User A is not satisfied with the time priority or other priority assignment that was assigned to User A's trade order commitment, in which case User A may have reason to manipulate the trading platform by failing to reveal the trade order plaintext or revealing a trade order plaintext that is in fact different from the trade order plaintext that was actually used to generate the trade order commitment by the Cryptographic Platform.

As such, in some embodiments, one or more other users on the network, such as user B 128, for example through those users' Cryptographic Platforms, may be allowed to access one or more trade order commitments and one or more trade order plaintexts that allegedly correspond to the same and verify their correlation or correspondence at block 122. In other words, at block 122, in some embodiments, one or more other users on the network or platform, such as User B, can be allowed to verify that the trade order plaintext was published and in fact corresponds to the trade order commitment that was previously revealed. In some embodiments, if the verification succeeds in the sense that the trade order plaintext was published and that it actually corresponds to the trade order commitment, then there is no issue and the process or platform can continue. However, if the verification fails in the sense that the trade order plaintext was not published or that it does not correspond to the trade order commitment that was previously revealed and used to assign the time priority or other priority assignment, then a penalty can be imposed on User A at block 124.

In addition, in some embodiments, the order matching results and resulting trades can also be auditable or verified by one or more users on the network or platform, such as User B 128. For example, in some embodiments, at block 126, one or more other users on the network or platform, such as User B, can be allowed to verify that the one or more trades posted on the Trade Board 118 actually corresponds or correlates to the one or more trade order plaintexts and trade order priorities posted on the Trade Order Board 114. In some embodiments, if the verification succeeds in the sense that the one or more trades corresponds or correlates to the one or more trade order plaintexts and the one or more trade order priorities, then then there is no issue and the process or platform can continue. However, if the verification fails in the sense that the one or more trades does not correspond or correlates to the one or more trade order plaintexts and the one or more trade order priorities, then User B can initiate some form of penalty on the Order Matching Platform. For example, User B may sue the Order Matching Platform at block 130.

FIG. 2 is a chart illustrating example embodiment(s) of publication boards and information that can be posted on the same. As described above in relation to FIG. 1, in some embodiments, the system can comprise one or more publication boards and/or be configured to post or publicize information on one or more publication boards. For example, there can be one or more of a Commitment Board 106, a Priority Board 110, a Trade Order Board 114, or a Trade Board 118. Each or some of the boards can be all on same or different computer systems or locations. For example, each or some of the boards can be on a system that is wholly separate from the Cryptographic Platform, Order Matching Platform, Centralized Ledger System, Decentralized Ledger System, or the like. In other embodiments, one or more boards can be on the same system as one or more of the Cryptographic Platform, Order Matching Platform, Centralized Ledger System, Decentralized Ledger System, or the like. In some embodiments, all or some of the publication boards are public, such as the New York Times, Twitter, a blockchain, blockchain-based platform, DLT platform, or the like. In some embodiments, all or some of the publication boards are not truly public; however, each or some of the publication boards can be visible at least to all users or network participants on the network that wish to confirm correct behavior of the system. In some embodiments, the network only comprises one of each publication board; however, it is to be understood that the different publication boards can be combined into a single or fewer publication boards. Further, in some embodiments, one or more of the publication boards discussed herein can be split up into more publication boards. In addition, in some embodiments, there can be a distinct publication board for each trading pair.

Figure 3:
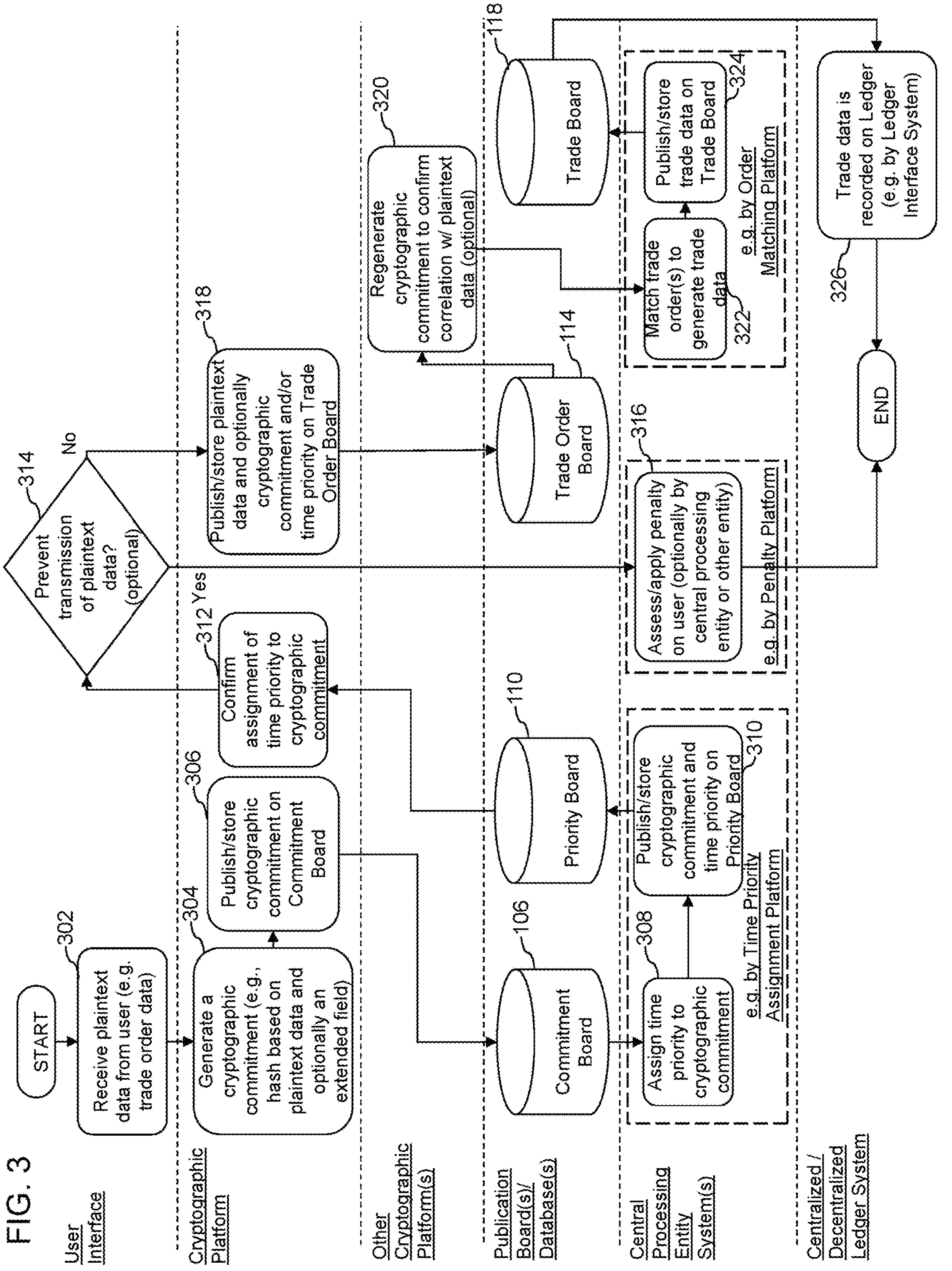
FIG. 3 is a flowchart illustrating an overview of an example embodiment(s) of trustless centralized order matching.

In some embodiments, the Commitment Board 106 can comprise a list of commitments or cryptographic commitments, such as cryptographic hash commitments, generated by one or more Cryptographic Platforms on one or more user computing systems. In some embodiments, the Priority Board 110 can comprise a list of commitment-priority pairs. For example, the Priority Board 110 can comprise data sets of commitments or cryptographic commitments, such as cryptographic hash commitments, and time priorities assigned to each of the commitments or cryptographic commitments. The Trade Order Board 114 can comprise a list of commitment-priority-trade order plaintext triples. For example, the Trade Order Board 114 can comprise data sets of commitments or cryptographic commitments, time priorities assigned to each of the commitments or cryptographic commitments, and trade order plaintexts that were used or at least allegedly used to generate the commitments or cryptographic commitments. The Trade Board 118 can comprise a list of trades. For example, the Trade Board 118 can comprise trade data generated from matching one or more trade order plaintexts with one or more other trade order plaintexts FIG. 3 is a flowchart illustrating an overview of an example embodiment(s) of trustless centralized order matching. As illustrated in FIG. 3, in some embodiments, a User Interface can be configured to receive plaintext data, such as trade order data from a user at block 302. For example, the trade order data can include information about a particular asset that the user intends to buy or sell and a particular price and volume for the same.

In some embodiments, based on the received plaintext data, a Cryptographic Platform can be configured to generate a cryptographic commitment at block 304. For example, the cryptographic commitment can be a hash that is generated based on the plaintext data and optionally an extended field as discussed above. The Cryptographic Platform can be software operating on one or more user computing systems that are part of the network or platform, such as a trading platform. In some embodiments, at block 306, the Cryptographic Platform can be configured publish or store the cryptographic commitment on a Commitment Board 106 as discussed above. In some embodiments, the Cryptographic Platform can be configured to receive a digital signature from the user, for example via the User Interface, to generate a signed commitment. In some embodiments, the digital signature can be transmitted by the Cryptographic Platform together with the cryptographic commitment that is being transmitted to the Commitment Board 106. The user's digital signature can be published on the Commitment Board such that everyone who can see the commitment can also see the digital signature. In some embodiments, the digital signature can be an extra field that is appended to the commitment. Generally speaking, one purpose of the digital signature can be to authenticate the commitment or any other digital message.

In some embodiments, a Central Processing Entity System(s) or a Time Priority Assignment Platform (or Other Priority Assignment Platform) can be configured to assign time priorities or other priority assignments to each or some cryptographic commitments that are posted on the Commitment Board 106 at block 308. The Time Priority Assignment Platform (or Other Priority Assignment Platform) can be software operating on the Central Processing Entity System(s) or on a wholly separate computing system. As previously discussed, the time priorities can be assigned based solely on the cryptographic commitments and without knowledge of the actual underlying or corresponding plaintext data that was used to generate the cryptographic commitment by the Cryptographic Platform. As such, there can be no incentive for the Central Processing Entity System(s) or Time Priority Assignment Platform (or Other Priority Assignment Platform) to manipulate the time priorities assigned. In some embodiments, at block 310, the Central Processing Entity System(s) or Time Priority Assignment Platform (or Other Priority Assignment Platform) can be configured to publish or store the cryptographic commitment and time priority or other priority assignment assigned thereto on a Priority Board 110 as discussed above.

In some embodiments, the Cryptographic Platform can be configured to access the Priority Board 110 or information posted thereon to confirm the time priority or other priority assignment assigned to the cryptographic commitment at block 312. As such, the user can, in some embodiments, review and verify the time priority or other priority assignment assigned to the cryptographic commitment. In some circumstances, the user may decide not to reveal the plaintext data corresponding to the cryptographic commitment. For example, the user may not be satisfied with the time priority or other priority assignment that was assigned to the user's cryptographic commitment for one reason or another.

As such, optionally, the user may decide to prevent transmission of the corresponding plaintext data at block 314. If the user prevents transmission of the corresponding plaintext data, the system can be configured to assess and apply a penalty on the user. For example, in some embodiments, the Central Processing Entity System(s) or a Penalty Platform can be configured to assess and apply a penalty on the user at block 316. The Penalty Platform can be software operating on the Central Processing Entity System(s) or on a wholly separate computing system, such as one operated by a third-party authority.

Alternatively, if there is no prevention of transmission of plaintext data, the Cryptographic Platform, in some embodiments, can be configured to publish or store the plaintext data and optionally the cryptographic commitment and/or time priority assigned to the same on a Trade Order Board 114 at block 318 as discussed above. Based on the information posted on the Trade Order Board 114, one or more other users on the network or platform may want to verify correspondence between the cryptographic commitment that was used to assign the time priorities and the later revealed plaintext data. For example, in some embodiments, one or more other Cryptographic Platforms on the network or platform used by one or more other users can regenerate the cryptographic commitment using the later published plaintext data at block 320. If the regenerated cryptographic commitment matches the previously published cryptographic commitment that was used for time priority assignment or other priority assignment purposes, then the verification is complete.

In some embodiments, the Central Processing Entity System(s) or an Order Matching Platform can be configured to match one or more trade orders to generate trade data at block 322. The Order Matching Platform can be software operating on the Central Processing Entity System(s) or on a wholly separate computing system. In some embodiments, the Order Matching Platform or an order matching algorithm thereof can be available on the computing system of every user on the network such that the user may audit the order matching process. As such, in some embodiments, any or every user on the network can verify the correspondence or correlation between the initially published cryptographic commitment and the later revealed plaintext data and/or also verify that the matching of the one or more orders are correct. In some embodiments, at block 324, the Central Processing Entity System(s) or Order Matching Platform can be further configured to publish or store the trade data on a Trade Board 118 as discussed above. In some embodiments, the generated trade data is recorded on a Centralized or Decentralized Ledger System at block 326, for example by transmission from an Electronic Ledger Interface. In some embodiments, the Electronic Ledger Interface can be part of the Cryptographic Platform or a separate software engine or platform operating on a computing system of the user. In some embodiments, the Electronic Ledger Interface can be operating on a Centralized Processing Entity System or other computer system wholly separate from the user computing system.

Figure 4:
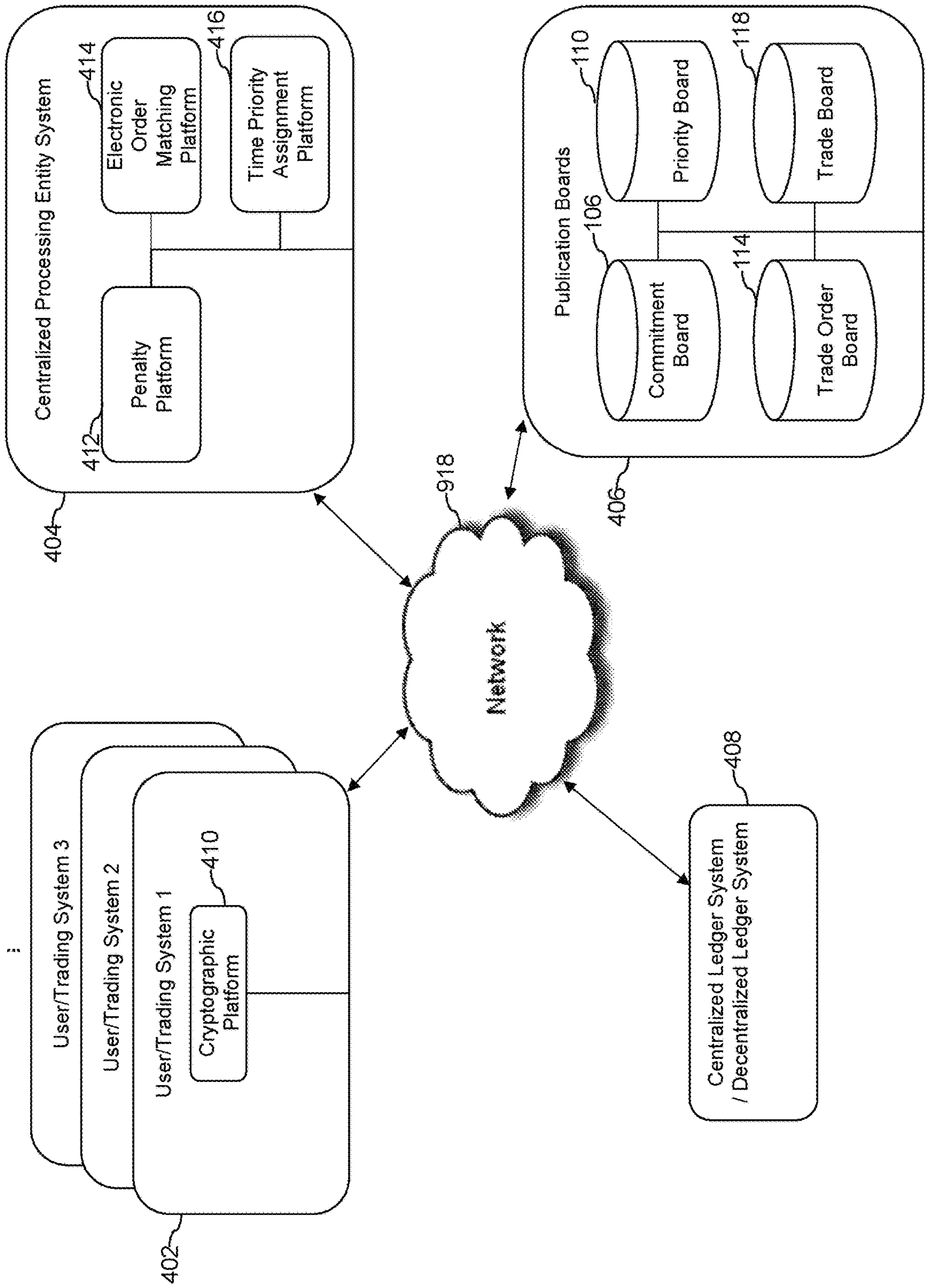
FIG. 4 is a schematic diagram illustrating an example embodiment(s) of a trustless centralized order matching system.

FIG. 4 is a schematic diagram illustrating an example embodiment(s) of a trustless centralized order matching system. As illustrated in FIG. 4, in some embodiments, a trustless centralized order matching system comprises one or more User or Trading Systems 402, a Centralized Processing Entity System 404, one or more Publication Boards 406, and a Centralized Ledger System or Decentralized Ledger System 408 for performing one or more processed described above. Each of the one or more User or Trading Systems 402, Centralized Processing Entity System 404, one or more Publication Boards 406, and Centralized Ledger System or Decentralized Ledger System 408 can be in communication with each other over a network. In some embodiments, the Publication Boards 406 can comprise one or more of a Commitment Board 106, Priority Board 110, Trade Order Board 114, and a Trade Board 118, as discussed above.

In addition, in some embodiments, each of the one or more User or Trading Systems 402 can comprise a Cryptographic Platform 410. The Cryptographic Platform 410 can be configured to generate a cryptographic commitment based on plaintext data inputted by a user and optionally an extended field, first publish the cryptographic commitment, and subsequently reveal the corresponding plaintext data, among other processes described herein.

In some embodiments, the Centralized Processing Entity System 404 can comprise a Penalty Platform 412. The Penalty Platform 412 can be configured assess and/or apply one or penalties to users as described herein, such as users who fail to disclose or prevent disclosure of plaintext data within some predetermined time period after a time priority or other priority assignment is assigned to a previously disclosed commitment or other situations. In some embodiments, the Centralized Processing Entity System 404 can comprise an Electronic Order Matching Platform 414. The Electronic Order Matching Platform 414 can be configured to match one or more trade orders based on plaintext data as described herein. In some embodiments, the Centralized Processing Entity System 404 can comprise a Time Priority Assignment Platform (or Other Priority Assignment Platform) 416. The Time Priority Assignment Platform (or Other Priority Assignment Platform) 416 can be configured to assign time priorities to one or more commitments, such as cryptographic commitments, without knowledge of the corresponding plaintext data.

Embodiment(s) of Trustless Decentralized Order Matching

Figure 5:
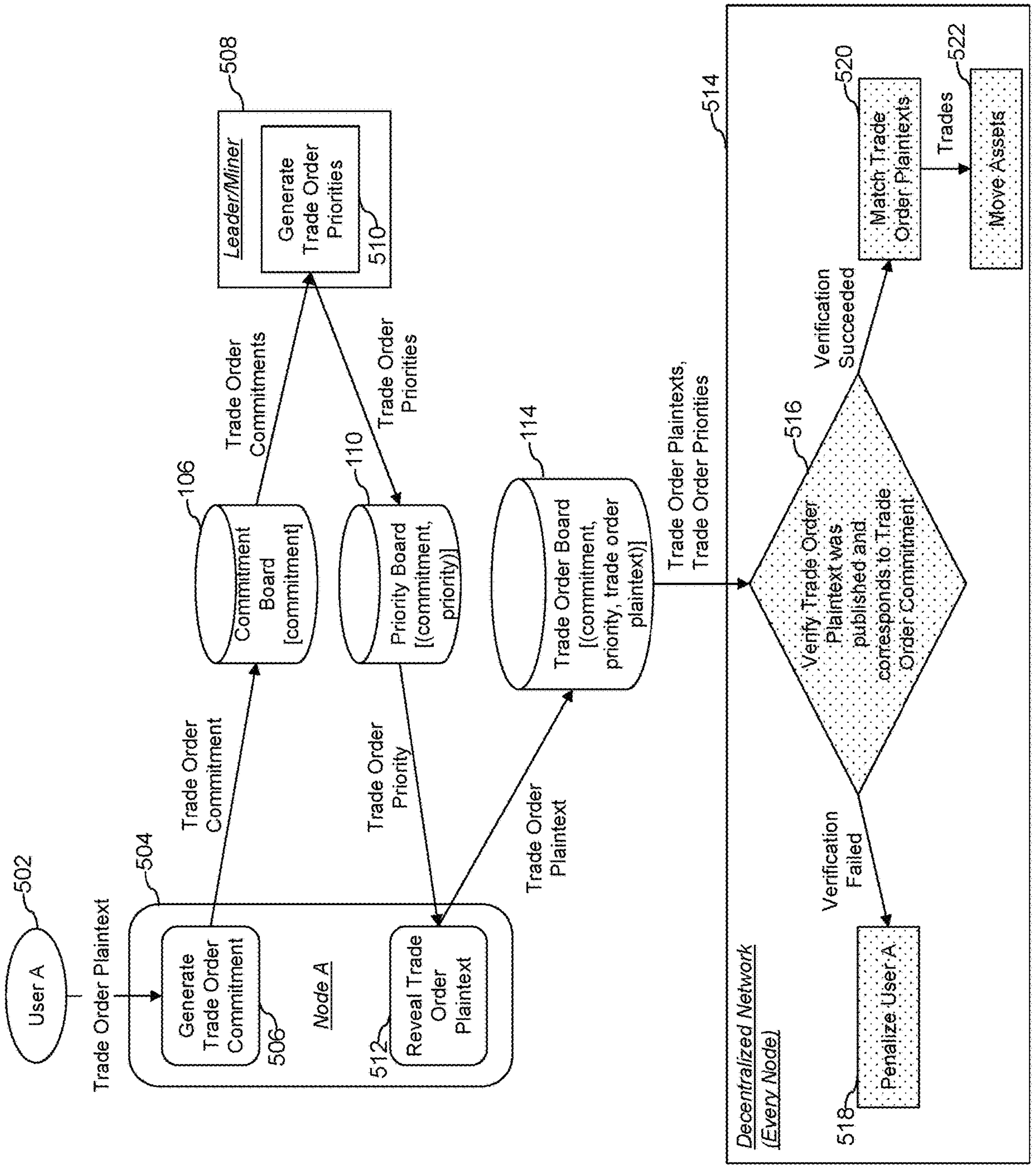
FIG. 5 is a flowchart illustrating an overview of an example embodiment(s) of trustless decentralized order matching.

Some embodiments of systems, methods, and devices for reducing and/or eliminating data leakage can be utilized to provide a trustless order matching system for an electronic ledger, such as a centralized ledger platform, distributed ledger technology (DLT) or blockchain-based platform. In some embodiments, the trustless order matching can be decentralized. In other words, in some embodiments, the system can be configured to utilize cryptographic commitments, such as cryptographic hash commitments, in decentralized networks to hide information in decentralized offer matching. FIG. 5 is a flowchart illustrating an overview of an example embodiment(s) of trustless decentralized order matching. In the embodiment illustrated in FIG. 5, actions or events generally occur on a timeline, in which actions or events towards the top of the figure occur sooner than actions or events towards the bottom of the figure.

In addition, different actors or platforms are designated with different common identifiers in FIG. 5. For example, the trustless decentralized order matching system and/or process illustrated in FIG. 5 refers to a User A 502 and comprises a Node A 504, whose actions are identified in rounded boxes, and Leader/Miner system 508, whose actions are identified in square boxes. The trustless decentralized order matching system and/or process illustrated in FIG. 5 further comprises a Decentralized Network 514, comprising one or more Nodes, whose actions are identified in shapes with dotted backgrounds. The trustless decentralized order matching system and/or process illustrated in FIG. 5 also comprises one or more Publication Boards 106, 110, 114.

More specifically, as illustrated in FIG. 5, in some embodiments, a User A 502 can input trade order plain text comprising trade order information into a user computing system, or Node A 504. The Decentralized Network 514 or Platform can comprise a plurality of user nodes, including but not limited to Node A 504. In some embodiments, Node A can be configured to generate a trade order commitment at block 506 based on the inputted trade order plain text from User A For example, the trade order commitment can be a cryptographic commitment or a cryptographic hash commitment that does not disclose the actual corresponding trade order or trade order plaintext. In some embodiments, the generated trade order commitment can be posted or otherwise publicized on a Commitment Board 106 as described above.

In some embodiments, the one or more trade order commitments can be transmitted to or otherwise accessed by a Leader System or a Miner System 508. The Leader or Miner System 508 can be configured to generate one or more trade order priorities for the one or more trade order commitments at block 510. In some embodiments, the one or more generated trade order priorities can be posted or otherwise publicized on a Priority Board 110 as described above.

In some embodiments, the trade order priority can be transmitted to or otherwise accessed by Node A 504 and any other node on the Decentralized Network 514 or platform. For example, User A can be allowed to verify the time priority or other priority assignment assigned to the Trade Order Commitment that User A inputted. In some embodiments, Node A 504 can be further configured to reveal the corresponding trade order plaintext 512 that was used to generate the trade order commitment at block 512, for example optionally if/when User A verifies the time priority or other priority assignment. In some embodiments, the trade order plaintext can be posted or otherwise publicized on a Trade Order Board 114 as described above.

In some embodiments, the one or more trade order plaintexts and one or more trade order priorities assigned to those trade order commitments corresponding to the one or more trade order plaintexts can be transmitted or otherwise accessed by the Decentralized Network 514. For example, in some embodiments, one or more nodes on the Decentralized Network 514, or every node on the Decentralized Network 514, can be configured to verify that the trade order plaintext was published and in fact corresponds to the trade order commitment that was previously revealed at block 516. In some embodiments, if the verification succeeds in the sense that the trade order plaintext was published and that it actually corresponds to the trade order commitment, then there is no issue and the process or platform can continue. For example, in some embodiments, the Decentralized Network 514 can then be configured to match one or more trade order plaintexts at block 520 based on the one or more trade order plaintexts and one or more trade order priorities. One or more trade orders can be matched with one or more other trade orders, depending on the trade order information. In some embodiments, the Decentralized Network 514 or Asset Ledger can be configured to move one or more assets at block 522 based on the one or more trades.

However, if the verification at block 516 fails in the sense that User A did not reveal the trade order plaintext or revealed a trade order plaintext that does not correspond to the trade order commitment that was previously revealed and used to assign the time priority or other priority assignment, for any of the reasons discussed above, then the Decentralized Network 514 or Platform can be configured to penalize User A at block 518.

Figure 6:
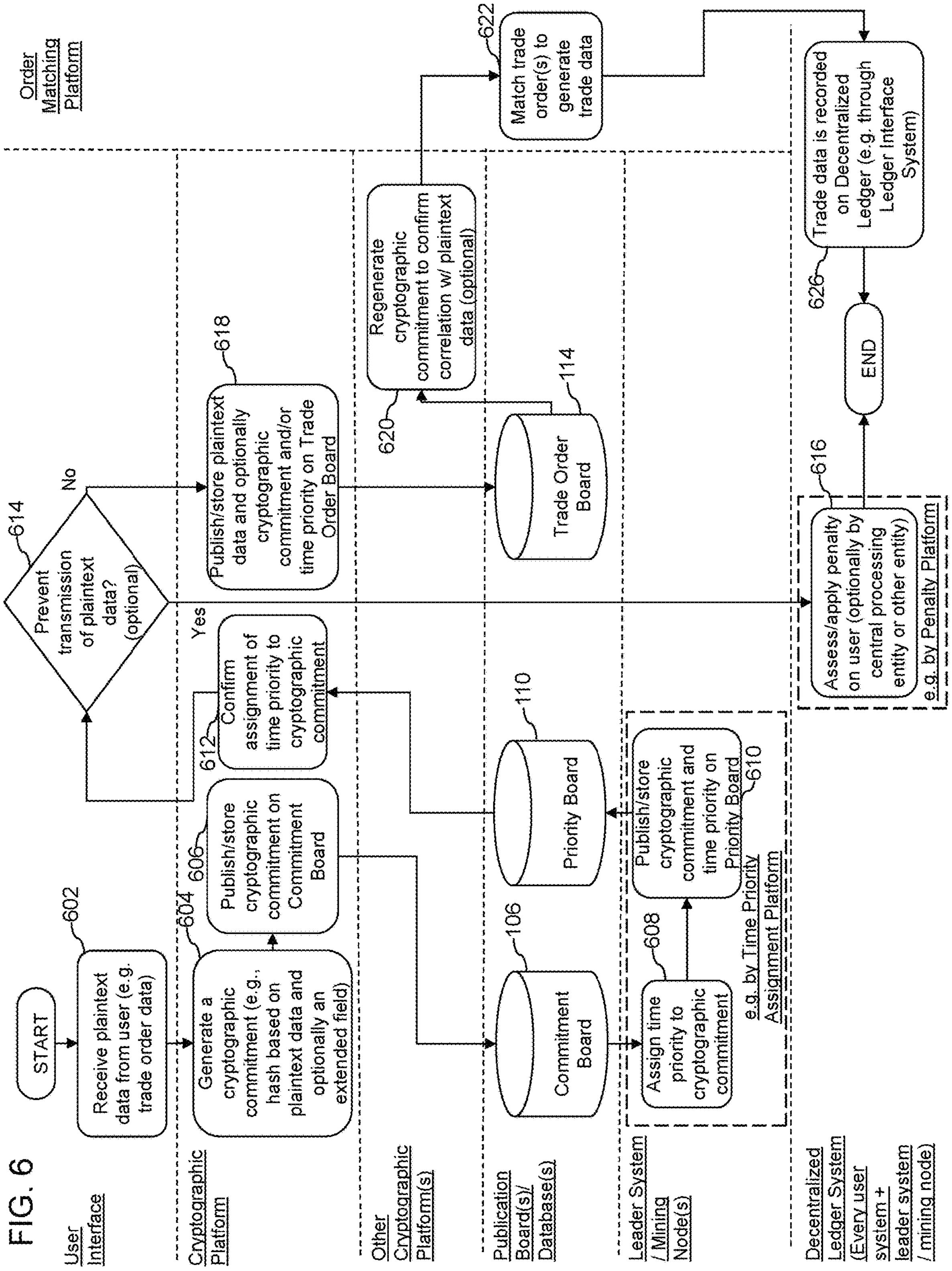
FIG. 6 is a flowchart illustrating an overview of an example embodiment(s) of trustless decentralized order matching.

FIG. 6 is a flowchart illustrating an overview of an example embodiment(s) of trustless decentralized order matching. As illustrated in FIG. 6, in some embodiments, a User Interface can be configured to receive plaintext data, such as trade order data from a user at block 602. For example, the trade order data can include information about a particular asset that the user intends to buy or sell and a particular price and volume for the same.

In some embodiments, based on the received plaintext data, a Cryptographic Platform can be configured to generate a cryptographic commitment at block 604. For example, the cryptographic commitment can be a hash that is generated based on the plaintext data and optionally an extended field as discussed above. The Cryptographic Platform can be software operating on one or more user computing systems that are part of a Decentralized Network or Platform, such as a trading platform. In certain embodiments, at block 606, the Cryptographic Platform can be configured publish or store the cryptographic commitment on a Commitment Board 106 as discussed above. In some embodiments, the Cryptographic Platform can be configured to receive a digital signature from the user, for example via the User Interface, to generate a signed commitment. In certain embodiments, the digital signature can be transmitted by the Cryptographic Platform together with the cryptographic commitment that is being transmitted to the Commitment Board 106. The user's digital signature can be published on the Commitment Board such that everyone who can see the commitment can also see the digital signature. In certain embodiments, the digital signature can be an extra field that is appended to the commitment. Generally speaking, one purpose of the digital signature can be to authenticate the commitment or any other digital message.

In some embodiments, a Leader System or one or more Mining Nodes of the Decentralized Network or Platform or a Time Priority Assignment Platform (or Other Priority Assignment Platform) can be configured to assign time priorities to each or some cryptographic commitments that are posted on the Commitment Board 106 at block 608. As used herein throughout this disclosure, the terms "Mining Nodes," "Miners," and the like are to be understood to include analogous terms and actors in the technical field, such as but not limited to Stakers in Proof-of-Stake systems, Bakers, Leaders in consensus protocols (including but not limited to PBFT-based protocols, Paxos-based protocols, Raft-based protocols or other Byzantine fault-tolerant or crash fault-tolerant consensus protocols), a distributed time/priority assignment system, Threshold Relay-based system, and any other party or parties that manages any time ordering, transaction validation, and/or double-spend protection in DLT platforms, blockchain platforms and blockchain-like platforms, such as any alternatives to traditional Proof-of-Work or other consensus systems. The Time Priority Assignment Platform (or Other Priority Assignment Platform) can be software operating on the Leader System or one or more Mining Nodes of the Decentralized Network or Platform or on a wholly separate computing system. As previously discussed, the time priorities can be assigned based solely on the cryptographic commitments and without knowledge of the actual underlying or corresponding plaintext data that was used to generate the cryptographic commitment by the Cryptographic Platform. As such, there can be no incentive for the Leader system, one or more Mining Nodes, or the Time Priority Assignment Platform (or Other Priority Assignment Platform) to manipulate the time priorities assigned. In some embodiments, at block 610, the Leader system, one or more Mining Nodes, or the Time Priority Assignment Platform (or Other Priority Assignment Platform) can be configured to publish or store the cryptographic commitment and time priority or other priority assignment assigned thereto on a Priority Board 110 as discussed above.

In some embodiments, the Cryptographic Platform can be configured to access the Priority Board 110 or information posted thereon to confirm the time priority or other priority assignment assigned to the cryptographic commitment at block 612. As such, the user can, in some embodiments, review and verify the time priority or other priority assignment assigned to the cryptographic commitment. In some circumstances, the user may decide not to reveal the plaintext data corresponding to the cryptographic commitment. For example, the user may not be satisfied with the time priority or other priority assignment that was assigned to the user's cryptographic commitment for one reason or another.

As such, optionally, the user may decide to prevent transmission of the corresponding plaintext data at block 614. If the user prevents transmission of the corresponding plaintext data, the Decentralized Ledger System can be configured to assess and apply a penalty on the user. For example, in some embodiments, the Decentralized Ledger System or a Penalty Platform can be configured to assess and apply a penalty on the user at block 616. The Decentralized Ledger System can comprise every user system on the Decentralized Network or Platform. The Decentralized Ledger System can also comprise the Leader System or the one or more Mining Nodes. The Penalty Platform can be software operating on the can be software operating on Decentralized Ledger System, such as any one or more of the user systems, Leader System or one or more Mining Nodes, or on a wholly separate computing system, such as one operated by a third-praty authority.

Alternatively, if there is no prevention of transmission of plaintext data, the Cryptographic Platform, in some embodiments, can be configured to publish or store the plaintext data and optionally the cryptographic commitment and/or time priority or other priority assignment assigned to the same on a Trade Order Board 114 at block 618 as discussed above. Based on the information posted on the Trade Order Board 114, one or more other users on the Decentralized Network or Platform may want to verify correspondence between the cryptographic commitment that was used to assign the time priorities and the later revealed plaintext data. For example, in some embodiments, one or more other Cryptographic Platforms on the Decentralized Network or Platform used by one or more other users can regenerate the cryptographic commitment using the later published plaintext data at block 620. If the regenerated cryptographic commitment matches the previously published cryptographic commitment that was used for time priority or other priority assignment purposes, then the verification is complete.

In some embodiments, an Order Matching Platform can be configured to match one or more trade orders to generate trade data at block 622. In some embodiments, the Order Matching Platform can be software operating on each of the user systems, such that every user of the network may audit the order matching process. As such, in some embodiments, any or every user on the network can verify the correspondence or correlation between the initially published cryptographic commitment and the later revealed plaintext data and/or also verify that the matching of the one or more orders are correct. In some embodiments, the Order Matching Platform can be software operating on the Leader System or each of the Mining Nodes. In some embodiments, the Order Matching Platform can be software operating on every user system as well as the Leader System or each of the Mining Nodes of the Decentralized Ledger System.

In some embodiments, the generated trade data is recorded on a Decentralized Ledger System at block 626, for example by transmission from an Electronic Ledger Interface. For example, every user system and Leader System or Mining Nodes can be configured to record the trade data generated from matching the one or more trade orders. In some embodiments, the Electronic Ledger Interface can be part of the Cryptographic Platform or a separate software engine or platform operating on a computing system of the user. In some embodiments, the Electronic Ledger Interface can be operating on a Leader System or Mining Node or other computer system wholly separate from the user computing system.

Embodiment(s) of Trustless Decentralized Order Matching for a Private Ledger

Figure 7A:
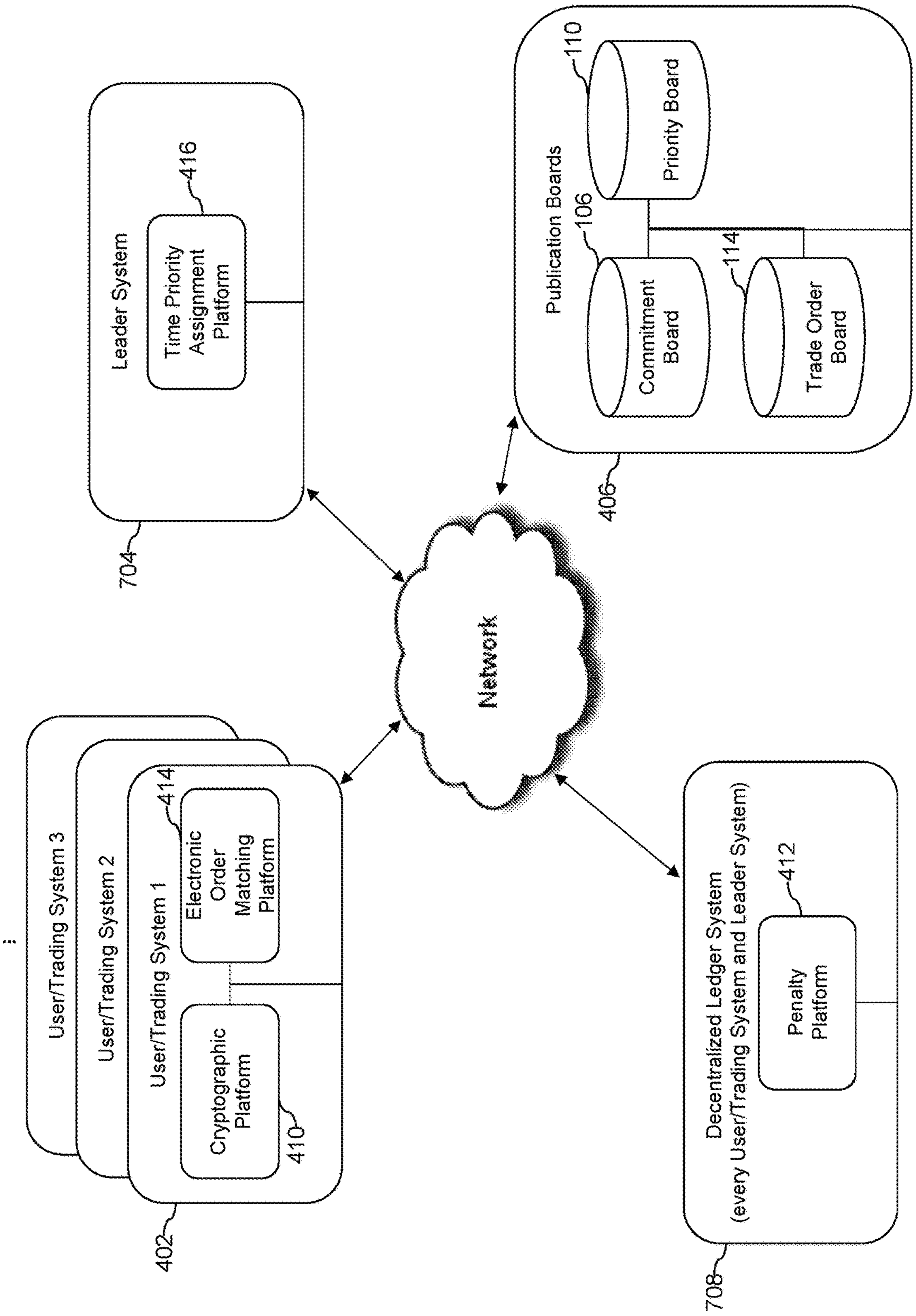
FIGS. 7A-7C are schematic diagrams illustrating example embodiments of a trustless decentralized order matching system for a private ledger.
Figure 7B:
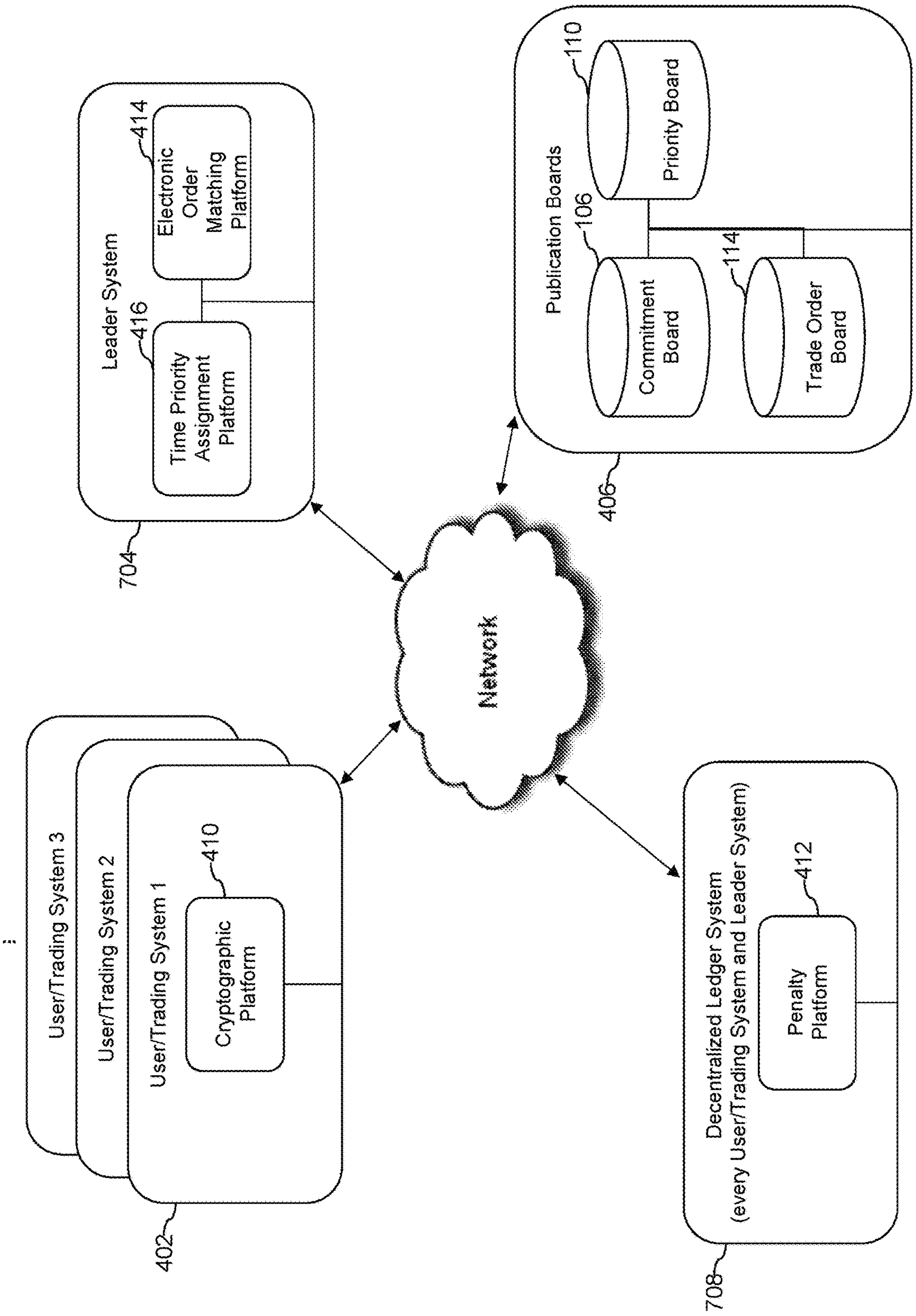
Figure 7C:
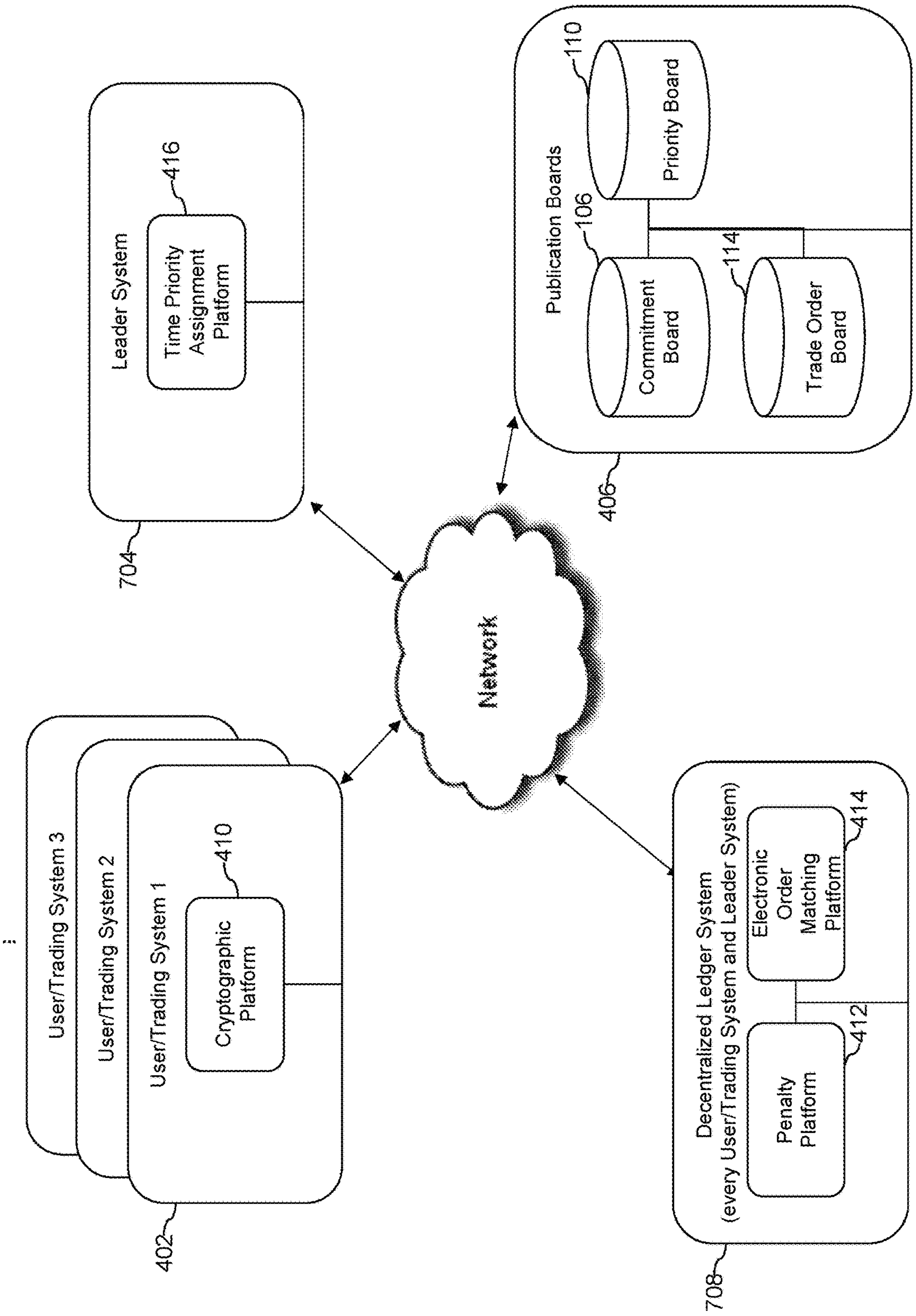

FIGS. 7A-7C are schematic diagrams illustrating example embodiments of a trustless decentralized order matching system for a private ledger. As illustrated in FIGS. 7A-7C, in some embodiments, a trustless decentralized order matching system comprises one or more User or Trading Systems 402, a Leader System 704, one or more Publication Boards 406, and a Decentralized Ledger System 708 for performing one or more processed described above. Each of the one or more User or Trading Systems 402, Leader System 704, one or more Publication Boards 406, and Decentralized Ledger System 708 can be in communication with each other over a network. In some embodiments, the Publication Boards 406 can comprise one or more of a Commitment Board 106, Priority Board 110, and a Trade Order Board 114, as discussed above.

Further, as illustrated in FIG. 7A, in some embodiments, each of the one or more User or Trading Systems 402 can comprise a Cryptographic Platform 410. The Cryptographic Platform 410 can be configured to generate a cryptographic commitment based on plaintext data inputted by a user and optionally an extended field, first publish the cryptographic commitment, and subsequently reveal the corresponding plaintext data, among other processes described herein.

In some embodiments, each of the one or more User or Trading Systems 402 can further comprise an Electronic Order Matching Platform 414. The Electronic Order Matching Platform 414 can be configured to match one or more trade orders based on plaintext data as described herein.

In some embodiments, the Leader System 704 can comprise a Time Priority Assignment Platform (or Other Priority Assignment Platform) 416. The Time Priority Assignment Platform (or Other Priority Assignment Platform) 416 can be configured to assign time priorities to one or more commitments, such as cryptographic commitments, without knowledge of the corresponding plaintext data.

In some embodiments, the Decentralized Ledger System 708 can comprise or refer to every User or Trading System 402 as well as the Leader System 704 on the Decentralized Network or Platform. In some embodiments, the Decentralized Ledger System 708 can further comprise a Penalty Platform 412. The Penalty Platform 412 can be configured assess and/or apply one or penalties to users as described herein, such as users who prevent disclosure of plaintext data within some predetermined time period after a time priority or other priority assignment is assigned to a previously disclosed commitment or other situations.

In other embodiments, as illustrated in FIG. 7B, the Leader System 704 can comprise the Electronic Order Matching Platform 414 instead of each of the User or Trading Systems 402. Further, in yet other embodiments, as illustrated in FIG. 7C, the Electronic Order Matching Platform 414 can be located all across the Decentralized Ledger System. For example, in some embodiments, each of the User or Trading Systems 402 as well as the Leader System 704 can comprise the Electronic Order Matching Platform 414.

Embodiment(s) of Trustless Decentralized Order Matching for a Public Ledger

Figure 8A:
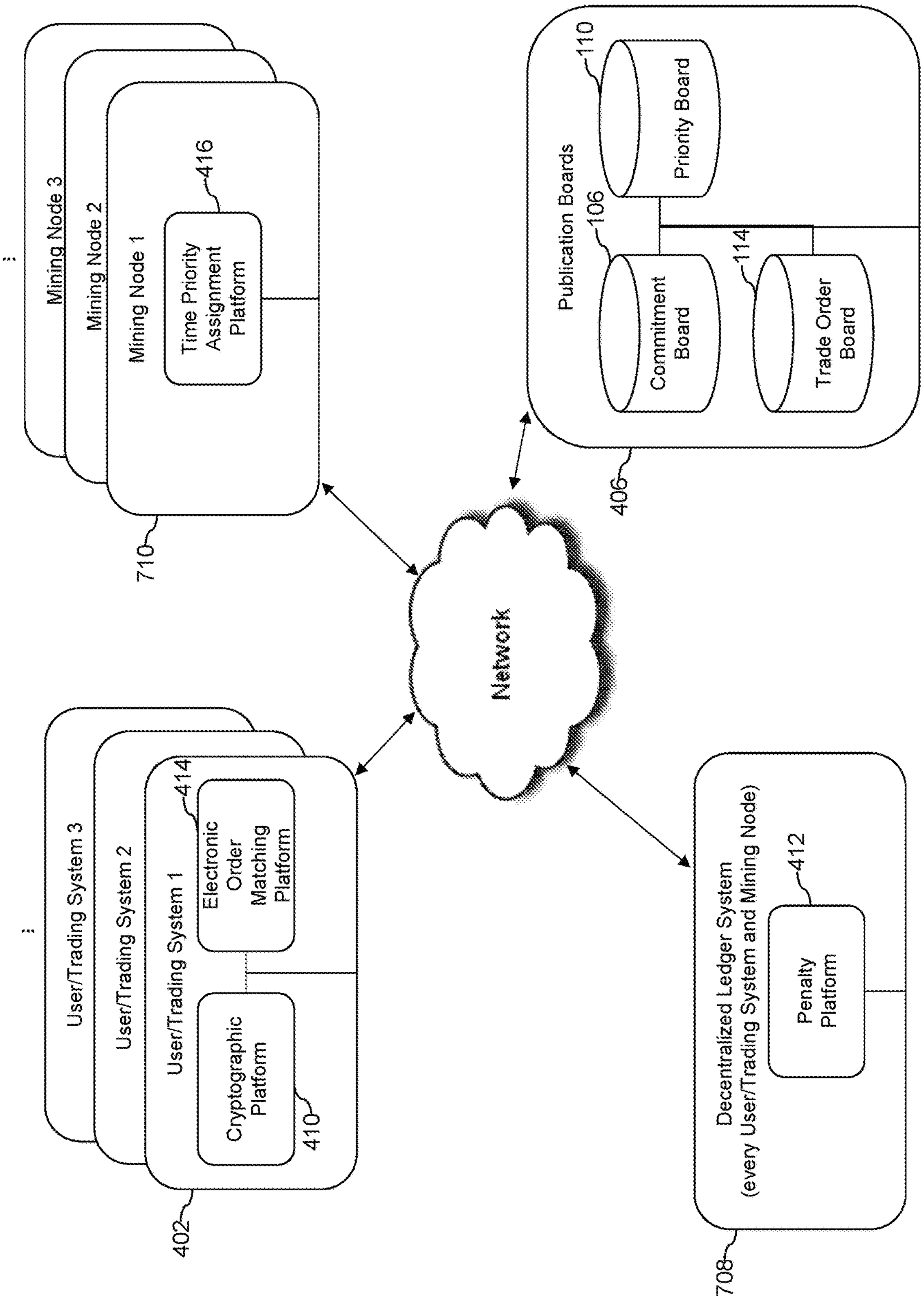
FIGS. 8A-8C are schematic diagrams illustrating example embodiments of a trustless decentralized order matching system for a public ledger.
Figure 8B:
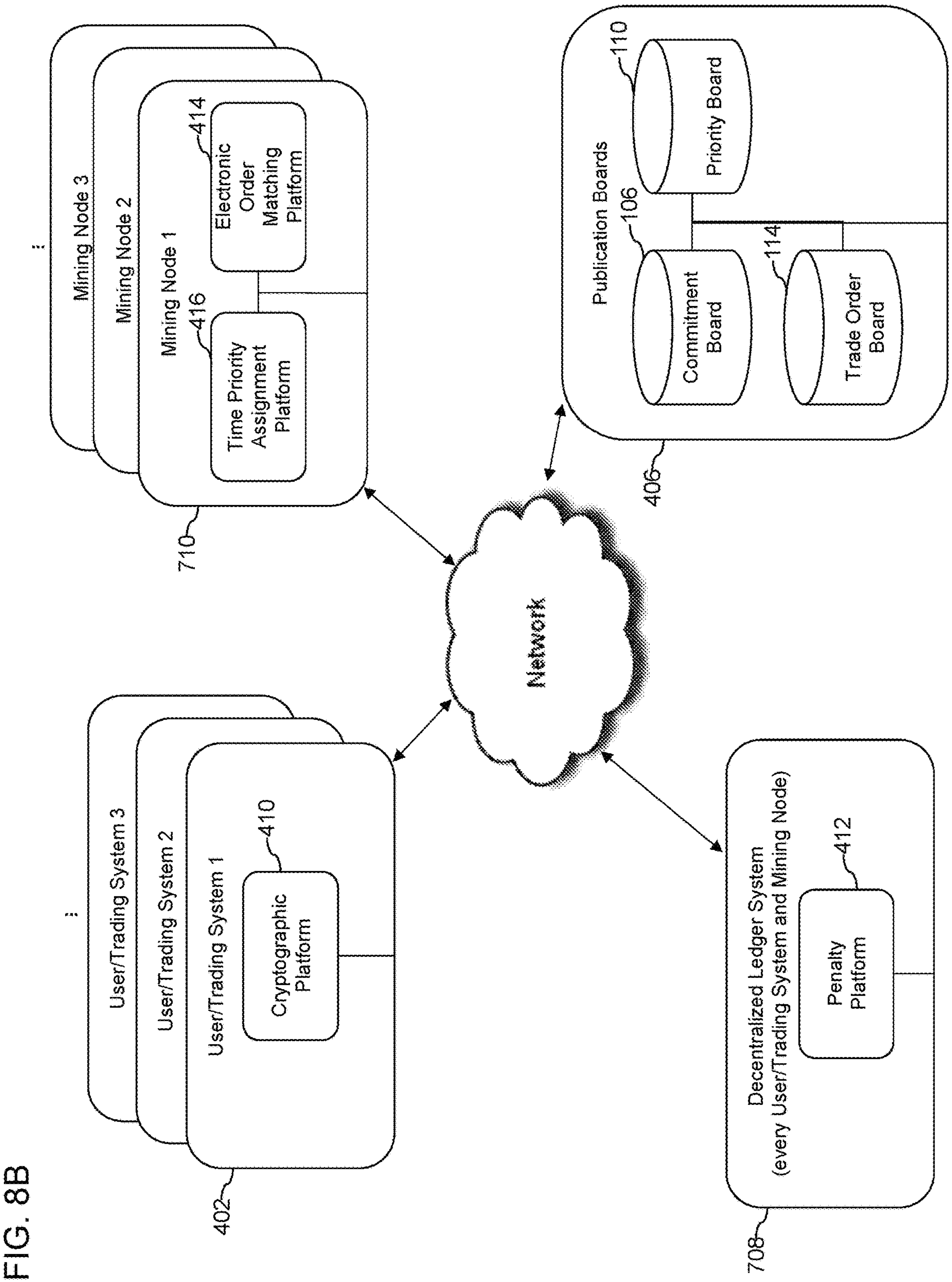
Figure 8C:
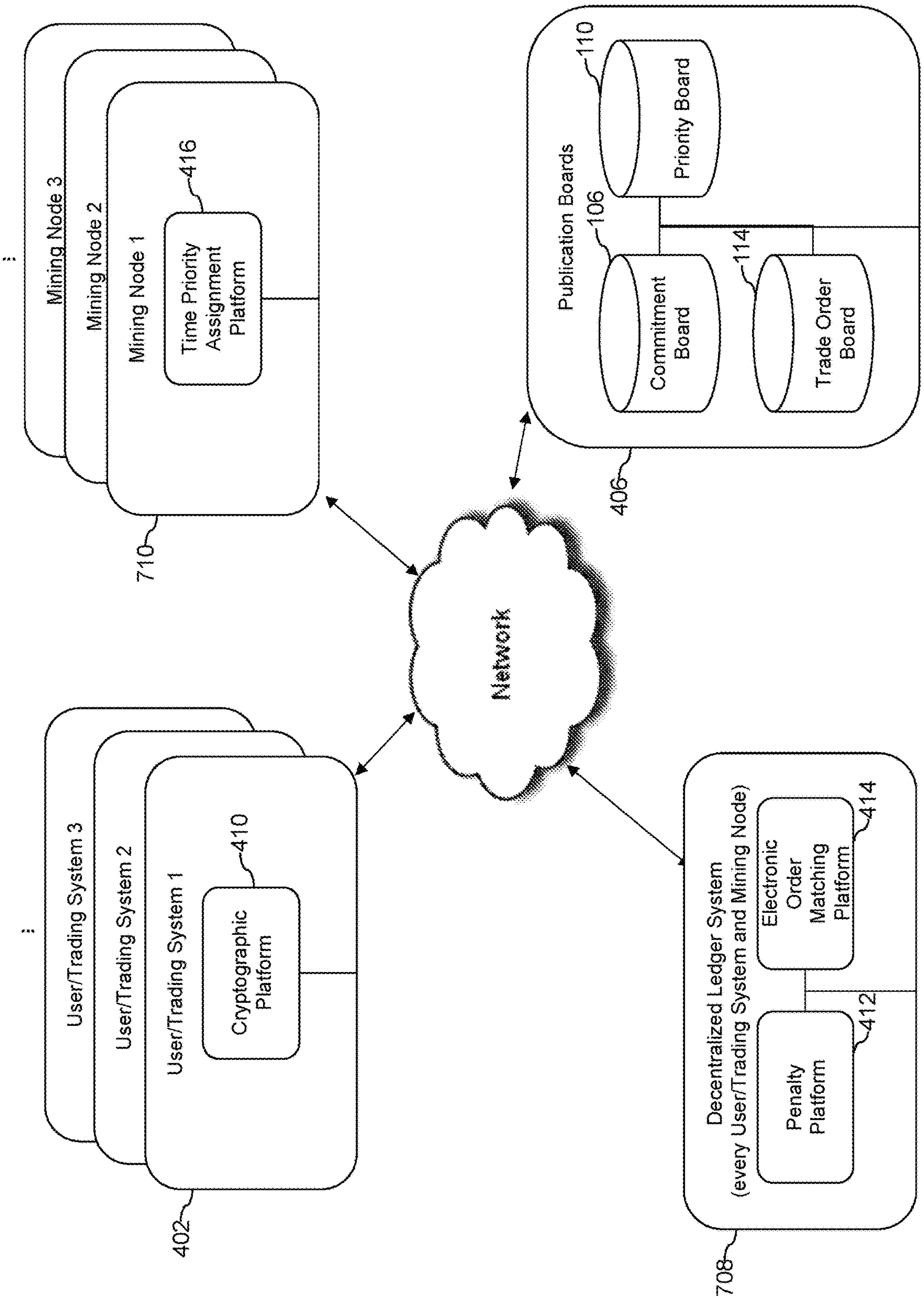

FIGS. 8A-8C are schematic diagrams illustrating example embodiments of a trustless decentralized order matching system for a public ledger. As illustrated in FIGS. 8A-8C, in some embodiments, a trustless decentralized order matching system comprises one or more User or Trading Systems 402, one or more Mining Nodes 710, one or more Publication Boards 406, and a Decentralized Ledger System 708 for performing one or more processed described above. Each of the one or more User or Trading Systems 402, one or more Mining Nodes 710, one or more Publication Boards 406, and a Decentralized Ledger System 708 can be in communication with each other over a network. In some embodiments, the Publication Boards 406 can comprise one or more of a Commitment Board 106, Priority Board 110, and a Trade Order Board 114, as discussed above.

Further, as illustrated in FIG. 8A, in some embodiments, each of the one or more User or Trading Systems 402 can comprise a Cryptographic Platform 410. The Cryptographic Platform 410 can be configured to generate a cryptographic commitment based on plaintext data inputted by a user and optionally an extended field, first publish the cryptographic commitment, and subsequently reveal the corresponding plaintext data, among other processes described herein.

In some embodiments, each of the one or more User or Trading Systems 402 can further comprise an Electronic Order Matching Platform 414. The Electronic Order Matching Platform 414 can be configured to match one or more trade orders based on plaintext data as described herein.

In some embodiments, each of the one or more Mining Nodes 710 can comprise a Time Priority Assignment Platform (or Other Priority Assignment Platform) 416. The Time Priority Assignment Platform (or Other Priority Assignment Platform) 416 can be configured to assign time priorities to one or more commitments, such as cryptographic commitments, without knowledge of the corresponding plaintext data.

In some embodiments, the Decentralized Ledger System 708 can comprise or refer to every User or Trading System 402 as well as every Mining Node 710 on the Decentralized Network or Platform. In some embodiments, the Decentralized Ledger System 708 can further comprise a Penalty Platform 412. The Penalty Platform 412 can be configured assess and/or apply one or penalties to users as described herein, such as users who prevent disclosure of plaintext data within some predetermined time period after a time priority or other priority assignment is assigned to a previously disclosed commitment or other situations.

In other embodiments, as illustrated in FIG. 8B, each of the Mining Nodes 710 can comprise the Electronic Order Matching Platform 414 instead of each of the User or Trading Systems 402. Further, in yet other embodiments, as illustrated in FIG. 8C, the Electronic Order Matching Platform 414 can be located all across the Decentralized Ledger System. For example, in some embodiments, each of the User or Trading Systems 402 as well as each of the Mining Nodes 710 can comprise the Electronic Order Matching Platform 414.

Computer System

Figure 9:
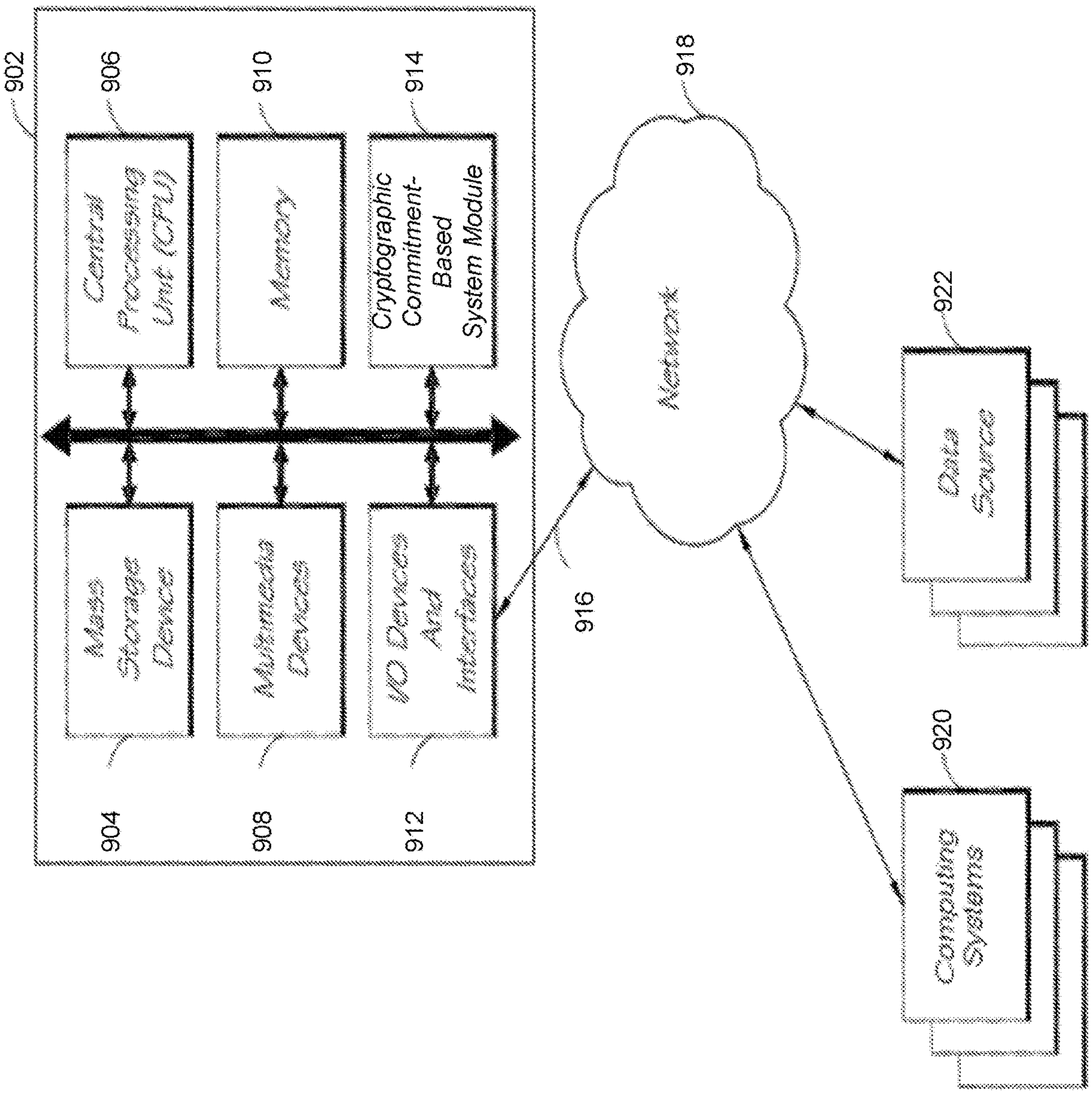
FIG. 9 is a block diagram depicting an embodiment(s) of a computer hardware system configured to run software for implementing one or more embodiments of systems, devices, and methods for reducing and/or eliminating data leakage for trustless order matching.

In some embodiments, the systems, processes, and methods described herein are implemented using one or more computing systems, such as the one illustrated in FIG. 9. The example computer system 902 is in communication with one or more computing systems 920 and/or one or more data sources 922 via one or more networks 918. While FIG. 9 illustrates an embodiment of a computing system 902, it is recognized that the functionality provided for in the components and modules of computer system 902 may be combined into fewer components and modules, or further separated into additional components and modules.

The computer system 902 can comprise a cryptographic commitment-based system module 914 that carries out the functions, methods, acts, and/or processes described herein. The cryptographic commitment-based system module 914 is executed on the computer system 902 by a central processing unit 906 discussed further below.

In general the word "module," as used herein, refers to logic embodied in hardware or firmware or to a collection of software instructions, having entry and exit points. Modules are written in a program language, such as JAVA, C or C++, PYPHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 902 includes one or more processing units (CPU) 906, which may comprise a microprocessor. The computer system 902 further includes a physical memory 910, such as random access memory (RAM) for temporary storage of information, a read only memory (ROM) for permanent storage of information, and a mass storage device 904, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 902 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 902 includes one or more input/output (I/O) devices and interfaces 912, such as a keyboard, mouse, touch pad, and printer. The I/O devices and interfaces 912 can include one or more display devices, such as a monitor, that allows the visual presentation of data to a user. More particularly, a display device provides for the presentation of GUIs as application software data, and multi-media presentations, for example. The I/O devices and interfaces 912 can also provide a communications interface to various external devices. The computer system 902 may comprise one or more multi-media devices 908, such as speakers, video cards, graphics accelerators, and microphones, for example.

The computer system 902 may run on a variety of computing devices, such as a server, a Windows server, a Structure Query Language server, a Unix Server, a personal computer, a laptop computer, and so forth. In other embodiments, the computer system 902 may run on a cluster computer system, a mainframe computer system and/or other computing system suitable for controlling and/or communicating with large databases, performing high volume transaction processing, and generating reports from large databases. The computing system 902 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 902 illustrated in FIG. 9 is coupled to a network 918, such as a LAN, WAN, or the Internet via a communication link 916 (wired, wireless, or a combination thereof). Network 918 communicates with various computing devices and/or other electronic devices. Network 918 is communicating with one or more computing systems 920 and one or more data sources 922. The cryptographic commitment-based system module 914 may access or may be accessed by computing systems 920 and/or data sources 922 through a web-enabled user access point. Connections may be a direct physical connection, a virtual connection, and other connection type. The web-enabled user access point may comprise a browser module that uses text, graphics, audio, video, and other media to present data and to allow interaction with data via the network 918.

Access to the cryptographic commitment-based system module 914 of the computer system 902 by computing systems 920 and/or by data sources 922 may be through a web-enabled user access point such as the computing systems' 920 or data source's 922 personal computer, cellular phone, smartphone, laptop, tablet computer, e-reader device, audio player, or other device capable of connecting to the network 918. Such a device may have a browser module that is implemented as a module that uses text, graphics, audio, video, and other media to present data and to allow interaction with data via the network 918.

The output module may be implemented as a combination of an all-points addressable display such as a cathode ray tube (CRT), a liquid crystal display (LCD), a plasma display, or other types and/or combinations of displays. The output module may be implemented to communicate with input devices 912 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 902 may comprise a physical or logical connection established between a remote microprocessor and a mainframe host computer for the express purpose of uploading, downloading, or viewing interactive data and databases on-line in real time. The remote microprocessor may be operated by an entity operating the computer system 902, including the client server systems or the main server system, and/or may be operated by one or more of the data sources 922 and/or one or more of the computing systems 920. In some embodiments, terminal emulation software may be used on the microprocessor for participating in the micro-mainframe link.

In some embodiments, computing systems 920 who are internal to an entity operating the computer system 902 may access the cryptographic commitment-based system module 914 internally as an application or process run by the CPU 906.

The computing system 902 may include one or more internal and/or external data sources (for example, data sources 922). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 902 may also access one or more databases 922. The databases 922 may be stored in a database or data repository. The computer system 902 may access the one or more databases 922 through a network 918 or may directly access the database or data repository through I/O devices and interfaces 912. The data repository storing the one or more databases 922 may reside within the computer system 902.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Other Embodiments

Although this invention has been disclosed in the context of some embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that some embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A system, comprising:

a physically distributed network of computers including:

a user computer;

a first set of one or more computers; and a second set of one or more computers including a time priority assignment platform, each computer from the physically distributed network of computers including a cryptographic platform, a user interface, a processor, and a memory configured to store a plurality of computer executable instructions, the processor of the user computer in communication with the memory and configured to execute the plurality of computer executable instructions in order to:

receive unencrypted plaintext data from a user via a user interface of the user computer, generate a cryptographic value by applying a one-way transformation that includes a hash function to the unencrypted plaintext data, the cryptographic value including an extended field having a variable data input that effects the generated cryptographic value, digitally sign the cryptographic value based on a private encryption key from a first public/private encryption key pair, to produce a first signed message; transmit the first signed message to the first set of one or more computers, after causing the first signed message to be sent, receive a second signed message that includes a concatenation of the first signed message and a third signed message sent from at least one computer that is different from the user computer and that is from the physically distributed network of computers, the second signed message being digitally signed based on a private encryption key from a second public/private encryption key pair associated with the physically distributed network of computers, and the third signed message being generated via the at least one computer based on second unencrypted plaintext data received at the at least one computer, upon receiving the second signed message, validate the second signed message to confirm assignment of a time priority, based on a public encryption key from the second public/private encryption key pair, access the unencrypted plaintext data, and upon confirming assignment of the time priority, transmit the unencrypted plaintext data to the first set of one or more computers.

2. The system of claim 1, wherein the unencrypted plaintext data is first unencrypted plaintext data, and the cryptographic value is a first hash value, the processor of the user computer being further configured to execute the plurality of computer executable instructions in order to:

receive (1) third unencrypted plaintext data having been received at a computer from the physically distributed network of computers and (2) a fourth signed message having a second hash value and having been generated via the computer;

generate a third hash value based on the third unencrypted plaintext data;

compare the second hash value to the third hash value to determine that the second hash value is different from the third hash value; and in response to determining that the second hash value is different from the third hash value, cause a penalty to be applied at the computer.

3. The system of claim 1, wherein the variable data input is based on a timestamp associated with generation of the cryptographic value.

4. The system of claim 1, wherein the cryptographic value is associated with at least one of a pseudorandom number generator (PRG), a one-way permutation (OWP), an asymmetric signature, or a Pedersen commitment.

5. The system of claim 1, wherein the unencrypted plaintext data is transmitted to the first set of one or more computers after a predefined delay.

6. The system of claim 1, wherein the unencrypted plaintext data is first unencrypted plaintext data, and the cryptographic value is a first hash value, the processor of the user computer being further configured to execute the plurality of computer executable instructions in order to:

receive an elected leader indication;

in response to and within a predetermined time from receiving the elected leader indication, receive (1) second unencrypted plaintext data having been received at a compute device from the physically distributed network of computers and (2) a fourth signed message having a second hash value and having been generated via the compute device;

generate a third hash value based on the second unencrypted plaintext data;

compare the second hash value to the third hash value to determine that the second hash value is different from the third hash value; and in response to determining that the second hash value is different from the third hash value, cause a penalty to be applied at the compute device.

7. The system of claim 1, wherein the concatenation of the first signed message and the third signed message includes a concatenation of each signed message sent between each compute device from the physically distributed network of computers within a predetermined time period.

8. A non-transitory, computer-readable medium storing instructions that, when executed by a processor, cause the processor to:

receive first unencrypted plaintext data via a user interface;

execute a number generator to generate a salt value;

apply a hash function to a concatenation of the first unencrypted plaintext data and the salt value, to produce a hash value having a predetermined length;

digitally sign the hash value based on a private encryption key from a first public/private encryption key pair, to produce a first signed message;

cause the first signed message to be sent to a plurality of compute devices that implement a distributed network;

after causing the first signed message to be sent, receive a second signed message that includes a concatenation of the first signed message and at least one third signed message sent from at least one compute device from the plurality of compute devices, the second signed message being digitally signed based on a private encryption key from a second public/private encryption key pair associated with the distributed network, and the at least one third signed message being generated via the at least one compute device based on second unencrypted plaintext data received at the at least one compute device;

validate the second signed message based on a public encryption key from the second public/private encryption key pair; and in response to validating the second signed message, cause the first unencrypted plaintext data to be sent to the plurality of compute devices.

9. The non-transitory, computer-readable medium of claim 8, wherein the hash value is a first hash value, the non-transitory, computer-readable medium further storing instructions to cause the processor to:

receive (1) third unencrypted plaintext data having been received at a compute device from the plurality of compute devices and (2) a fourth signed message having a second hash value and having been generated via the compute device;

generate a third hash value based on the third unencrypted plaintext data;

compare the second hash value to the third hash value to determine that the second hash value is different from the third hash value; and in response to determining that the second hash value is different from the third hash value, cause a penalty to be applied at the compute device.

10. The non-transitory, computer-readable medium of claim 8, wherein the number generator generates the salt value based on a timestamp associated with generation of the salt value.

11. The non-transitory, computer-readable medium of claim 8, wherein the instructions to cause the first unencrypted plaintext data to be sent to the plurality of compute devices include instructions to cause the first unencrypted plaintext data to be sent, after a predefined delay, to a peer-to-peer marketplace implemented by the plurality of compute devices.

12. The non-transitory, computer-readable medium of claim 8, wherein the hash value is a first hash value, the non-transitory, computer-readable medium further storing instructions to cause the processor to:

receive an elected leader indication;

in response to and within a predetermined time from receiving the elected leader indication, receive (1) third unencrypted plaintext data having been received at a compute device from the plurality of compute devices and (2) a fourth signed message having a second hash value and having been generated via the compute device;

generate a third hash value based on the third unencrypted plaintext data;

compare the second hash value to the third hash value to determine that the second hash value is different from the third hash value; and in response to determining that the second hash value is different from the third hash value, cause a penalty to be applied at the compute device.

13. The non-transitory, computer-readable medium of claim 8, wherein the concatenation of the first signed message and the at least one third signed message includes a concatenation of each signed message sent (1) from each compute device from the plurality of compute devices to (2) at least one remaining compute device from the plurality of compute devices, within a predetermined time period.

14. A method, comprising:

receiving first unencrypted plaintext data via a user interface;

executing a number generator to generate a salt value;

applying a hash function to a concatenation of the first unencrypted plaintext data and the salt value, to produce a hash value having a predetermined length;

digitally signing the hash value based on a private encryption key from a first public/private encryption key pair, to produce a first signed message;

causing the first signed message to be sent to a plurality of compute devices that implement a distributed network;

after causing the first signed message to be sent, receiving a second signed message that includes a concatenation of (1) the first signed message and (2) a third signed message sent from at least one compute device from the plurality of compute devices, the second signed message being digitally signed based on a private encryption key from a second public/private encryption key pair associated with the distributed network, and the third signed message being generated via the at least one compute device based on second unencrypted plaintext data received at the at least one compute device;

validating the second signed message based on a public encryption key from the second public/private encryption key pair; and in response to validating the second signed message, causing the first unencrypted plaintext data to be sent to the plurality of compute devices.

15. The method of claim 14, wherein the hash value is a first hash value, the method further comprising:

receiving (1) third unencrypted plaintext data having been received at a compute device from the plurality of compute devices and (2) a fourth signed message having a second hash value and having been generated via the compute device;

generating a third hash value based on the third unencrypted plaintext data;

comparing the second hash value to the third hash value to determine that the second hash value is different from the third hash value; and in response to determining that the second hash value is different from the third hash value, causing a penalty to be applied at the compute device.

16. The method of claim 14, wherein the number generator generates the salt value based on a timestamp associated with generation of the salt value.

17. The method of claim 14, wherein the causing the first unencrypted plaintext data to be sent to the plurality of compute devices includes causing the first unencrypted plaintext data to be sent, after a predefined delay, to a peer-to-peer marketplace implemented by the plurality of compute devices.

18. The method of claim 14, wherein the hash value is a first hash value, the method further comprising:

receiving an elected leader indication;

in response to and within a predetermined time from receiving the elected leader indication, receiving (1) third unencrypted plaintext data having been received at a compute device from the plurality of compute devices and (2) a fourth signed message having a second hash value and having been generated via the compute device;

generating a third hash value based on the third unencrypted plaintext data;

comparing the second hash value to the third hash value to determine that the second hash value is different from the third hash value; and in response to determining that the second hash value is different from the third hash value, causing a penalty to be applied at the compute device.

19. The method of claim 14, wherein the concatenation of the first signed message and the third signed message includes a concatenation of each signed message sent (1) from each compute device from the plurality of compute devices to (2) at least one remaining compute device from the plurality of compute devices, within a predetermined time period.

20. The method of claim 14, wherein the hash value is associated with at least one of a pseudorandom number generator (PRG), a one-way permutation (OWP), an asymmetric signature, or a Pedersen commitment.

* * * * *